United States Patent
Jaber

(10) Patent No.: US 6,993,547 B2
(45) Date of Patent: Jan. 31, 2006

(54) ADDRESS GENERATOR FOR FAST FOURIER TRANSFORM PROCESSOR

(75) Inventor: Marwan A Jaber, North-Montreal (CA)

(73) Assignee: Jaber Associates, LLC, Quebec (CA)

( * ) Notice: Subject to any disclaimer, the term of this patent is extended or adjusted under 35 U.S.C. 154(b) by 620 days.

(21) Appl. No.: 10/140,771

(22) Filed: May 7, 2002

(65) Prior Publication Data

US 2003/0041080 A1   Feb. 27, 2003

Related U.S. Application Data

(60) Provisional application No. 60/289,302, filed on May 7, 2001, now abandoned.

(51) Int. Cl.
*G06F 17/14* (2006.01)

(52) U.S. Cl. .................................................... 708/404

(58) Field of Classification Search ......... 708/403–405
See application file for complete search history.

(56) References Cited

U.S. PATENT DOCUMENTS

| | | | | |
|---|---|---|---|---|
| 5,091,875 A | * | 2/1992 | Wong et al. | 708/404 |
| 6,035,313 A | * | 3/2000 | Marchant | 708/404 |
| 2001/0032227 A1 | * | 10/2001 | Jaber | 708/400 |
| 2001/0051967 A1 | * | 12/2001 | Jaber | 708/403 |

* cited by examiner

*Primary Examiner*—D. H. Malzahn
(74) *Attorney, Agent, or Firm*—Allan Jacobson

(57) ABSTRACT

An address generator for use in conjunction with a fast Fourier transform processor includes an efficient architecture for computing the memory addresses of input data points, output data points and twiddle coefficients. In particular, multiplication operation in the calculation of memory addresses is minimized. Instead, a cascaded series of adders is used, in which the output of one adder is input to the next adder. At each stage of the cascaded adders, the same input variable is successively added. The cascaded adder structure is used in the writing address generator, the reading address generator and the twiddle coefficient address generator. In addition, a plurality of modulo N circuits is used in series with the cascaded series of adders to generate the twiddle coefficient addresses.

9 Claims, 14 Drawing Sheets

ARRAY ARCHITECTURE FOR AN 8-POINT RADIX-2 DIF FFT

COLUMN ARCHITECTURE FOR AN 8-POINT RADIX-2 FFT

8-POINT RADIX-2 CONSTANT GEOMETRY DIF FFT

PIPELINED ARCHITECTURE (BASIC PRINCIPLE)

$N_{PE} = \log_r (N)$

SIC FFT ARCHITECTURE (BASIC PRINCIPLE)

ONE OUTPUT WRITING ADDRESS GENERATOR

THE $k^{TH}$ WORD ARE STORED INTO THE ADDRESS MEMORY LOCATION GENERATED BY:
$$A_{(l,k)} = l\,(N/r) + k,$$
WHERE $k = N/r$ AND $l$ REFERS TO THE $l^{TH}$ BUTTERFLY'S OUTPUT r-OUTPUT WRITING ADDRESS GENERATOR

THE $k^{TH}$ WORD ARE STORED INTO THE ADDRESS MEMORY LOCATION GENERATED BY:
$$A_{(l,k)} = l\,(N/r)+k,$$
WHERE $k = N/r$ AND $l$ REFERS TO THE $l^{TH}$ BUTTERFLY'S OUTPUT

AN ALTERNATIVE MODEL FOR HARDWARE IMPLEMENTATION
OF THE r-OUTPUT WRITING ADDRESS GENERATOR

THE $k^{TH}$ WORD ARE STORED INTO THE ADDRESS MEMORY LOCATION GENERATED BY:

$$A_{(1,k)} = 1 \ (N/r) + k,$$

WHERE $k = N/r$ AND 1 REFERS TO THE $1^{TH}$ BUTTERFLY'S OUTPUT

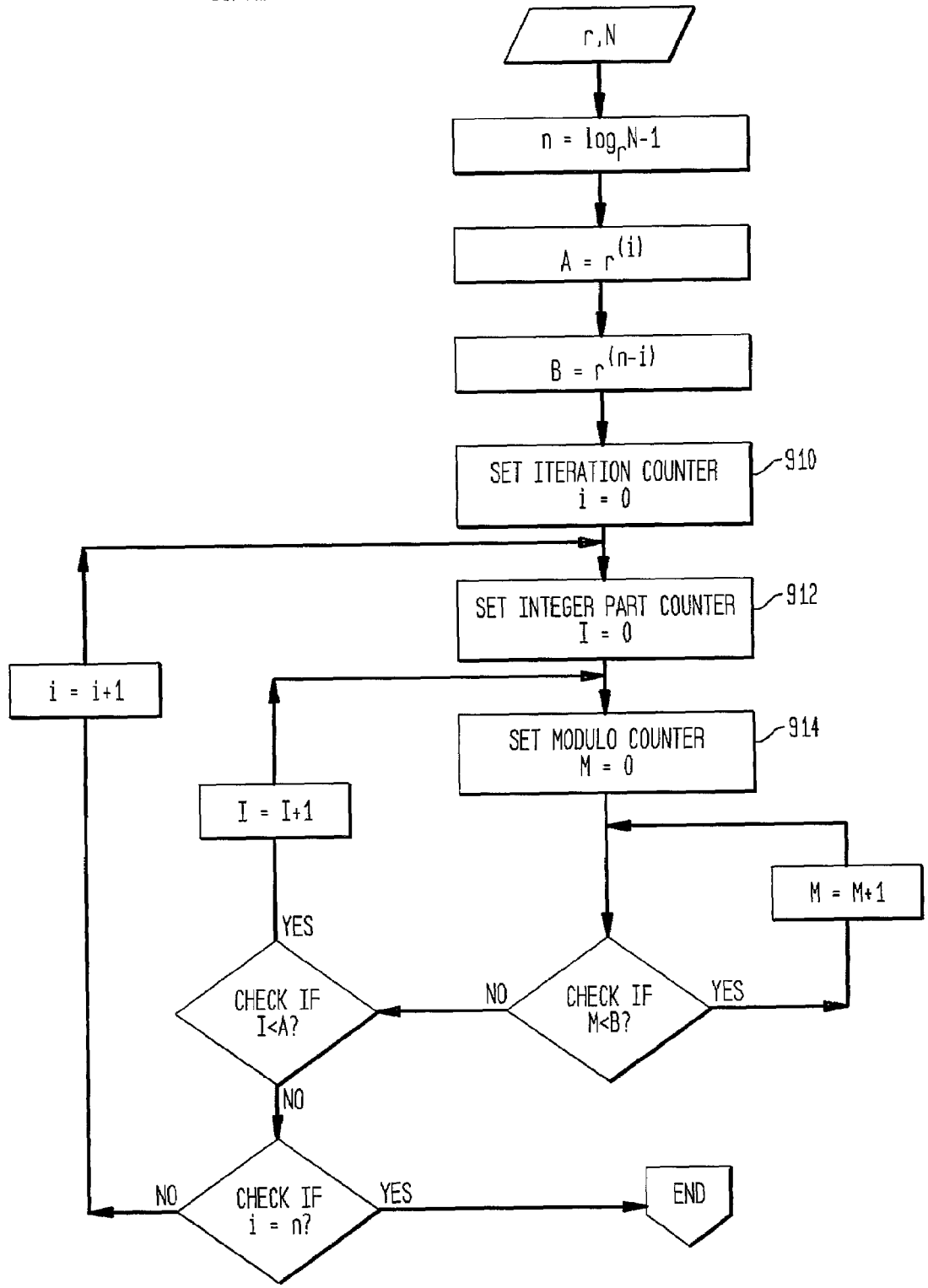

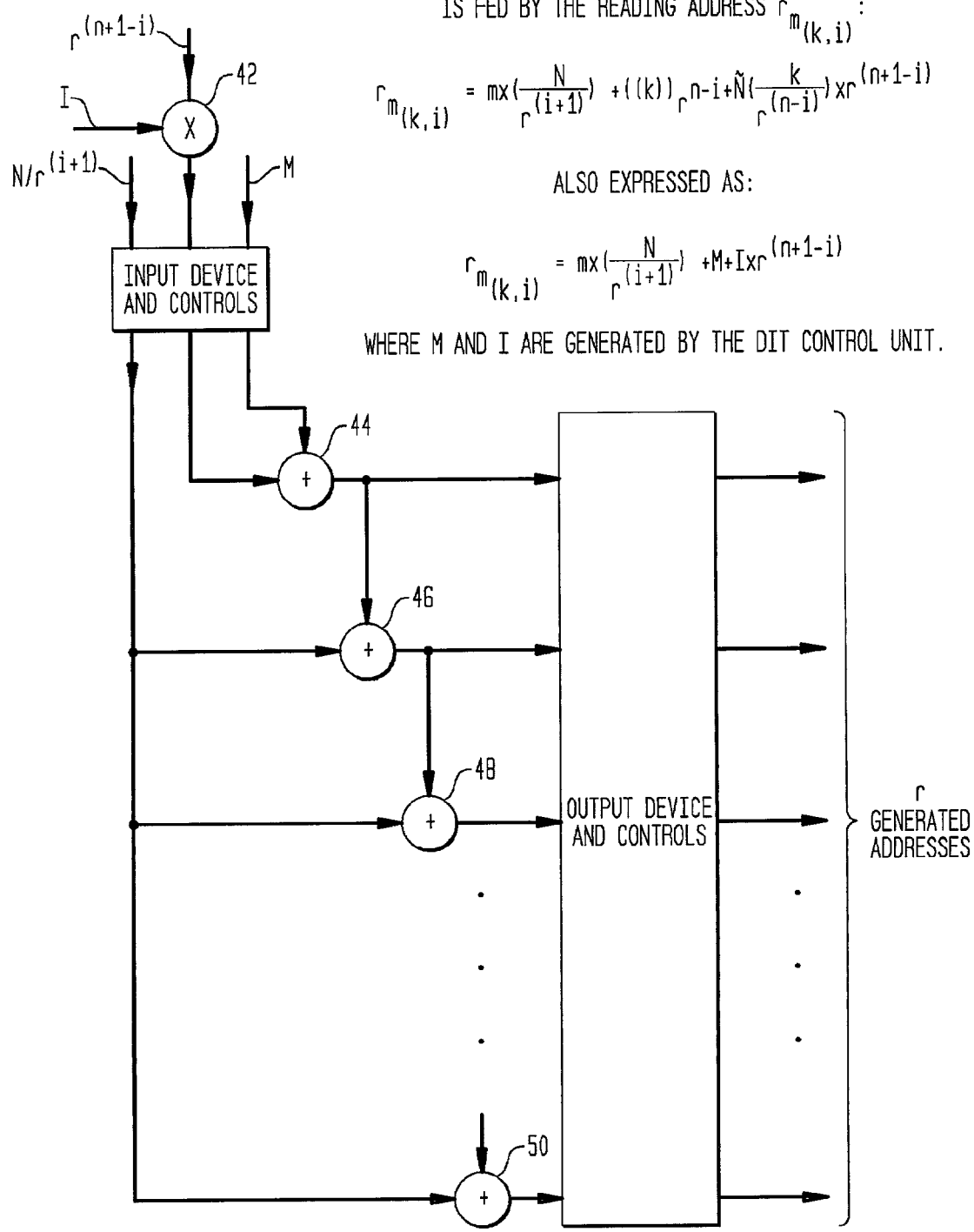

FIG. 10

HARDWARE IMPLEMENTATION OF r-INPUT-THE DIT READING ADDRESS GENERATOR.

THE $m^{TH}$ PE'S INPUT $x_{(m)}$ OF THE $k^{TH}$ WORD AT THE $i^{TH}$ ITERATION IS FED BY THE READING ADDRESS $r_{m_{(k,i)}}$:

$$r_{m_{(k,i)}} = m \times (\frac{N}{r^{(i+1)}}) + ((k))_{r^{n-i}} \tilde{N}(\frac{k}{r^{(n-i)}}) \times r^{(n+1-i)}$$

ALSO EXPRESSED AS:

$$r_{m_{(k,i)}} = m \times (\frac{N}{r^{(i+1)}}) + M + I \times r^{(n+1-i)}$$

WHERE M AND I ARE GENERATED BY THE DIT CONTROL UNIT.

OPTIMAL HARDWARE IMPLEMENTATION OF THE DIT READING ADDRESS GENERATOR.

SOFTWARE IMPLEMENTATION OF THE DIF CONTROL UNIT

DIF READING ADDRESS GENERATOR.

INPUT SEQUENCES TO THE PE'S ARE READ FROM FOLLOWING ADDRESSES:

$r_{m_{(k,i)}} = m \times (N/r) + k$ FOR $i = 0$, AND $r_{m_{(k,i)}} = m \times \frac{N}{r^2} + ((\tilde{N}(\frac{k}{r^{i-1}}) \times \frac{N}{r})) N + ((k))_{r^{i-1}} + \tilde{N}(\frac{k}{r^i}) \times r^{i-1}$ FOR $i > 0$ FOR $m = 1 = 0, 1, \ldots, r-1$,
WHERE M, I AND SUM[R] ARE GENERATED BY THE DIF CONTROL UNIT.

SOFTWARE IMPLEMENTATION OF MODULO OPERATION

THE MODULO CIRCUIT BLOCK DIAGRAM

HARDWARE IMPLEMENTATION OF THE DIT COEFFICIENT ADDRESS GENERATOR

MEMORY ADDRESS LOCATION OF THE TWIDDLE COEFFICIENTS IS GIVEN BY:

$$((lm\frac{N}{r} + \tilde{N}(\frac{K}{r^{(n-i)}})mr^{(n-i)}))N \text{ AND SIMPLIFIED AS:}$$

$$((lm\frac{N}{r} + Ixmxr^{(n-i)}))N$$

$$((mx(l\frac{N}{r} + Ixr^{(n-i)}))N$$

HARDWARE IMPLEMENTATION OF THE DIF COEFFICIENT ADDRESS GENERATOR

MEMORY ADDRESS LOCATION OF THE TWIDDLE COEFFICIENTS IS GIVEN BY:

$$((lm\frac{N}{r} + \tilde{N}(\frac{K}{r^i}))lr^i))N \quad \text{AND SIMPLIFIED AS:}$$

$$((lx(m\frac{N}{r} + \tilde{N}(\frac{K}{r^i})xr^i)))N$$

THE HARDWARE STRUCTURE OF THE DIT OR DIF COEFFICIENT ADDRESS GENERATOR TO BE USED WITH CONVENTIONAL DIT OR DIF BUTTERFLY STRUCTURE

US 6,993,547 B2

ADDRESS GENERATOR FOR FAST FOURIER TRANSFORM PROCESSOR

This application claims priority from provisional patent application 60/289,302, filed May 7, 2001, now abandoned.

FIELD OF INVENTION

The present invention relates to the field of Fast Fourier Transform analysis. In particular, the present invention relates to an address generator adapted for use in a fast Fourier transform method and apparatus.

BACKGROUND OF THE INVENTION

Physical parameters such as light, sound, temperature, velocity and the like are converted to electrical signals by sensors. An electrical signal may be represented in the time domain as a variable that changes with time. Alternatively, a signal may be represented in the frequency domain as energy at specific frequencies. In the time domain, a sampled data digital signal is a series of data points corresponding to the original physical parameter. In the frequency domain, a sampled data digital signal is represented in the form of a plurality of discrete frequency components such as sine waves. A sampled data signal is transformed from the time domain to the frequency domain by the use of the Discrete Fourier Transform (DFT). Conversely, a sampled data signal is transformed back from the frequency domain into the time domain by the use of the Inverse Discrete Fourier Transform (IDFT).

The Discrete Fourier Transform is a fundamental digital signal-processing transformation that provides spectral information (frequency content) for analysis of signals. The DFT and IDFT permit a signal to be processed in the frequency domain. For example, frequency domain processing allows for the efficient computation of the convolution integral useful in linear filtering and for signal correlation analysis. Since the direct computation of the DFT requires a large number of arithmetic operations, the direct computation of the DFT is typically not used in real time applications.

Over the past few decades, a group of algorithms collectively known as Fast Fourier Transform (FFT) have found use in diverse applications, such as digital filtering, audio processing and spectral analysis for speech recognition. The FFT reduces the computational burden so that it may be used for real-time signal processing. In addition, the fields of applications for FFT analysis are continually expanding.

Computational Burden

Computation burden is a measure of the number of calculations required by an algorithm. The DFT (and IDFT) process starts with a number (N) of input data points and computes a number (also N) of output data points. The DFT function is a sum of products, i.e., repeated multiplication of two factors (data and twiddle coefficients) to form product terms followed by the addition of the product terms to accumulate a sum of products (multiply-accumulate, or MAC operations). The direct computation of the DFT requires a large number of such multiply-accumulate mathematical operations, especially as the number of input points N is made larger. Multiplications by the twiddle factors $W_N^r$ dominate the arithmetic workload.

To reduce the computational burden imposed by the computationally intensive DFT, previous researchers developed the Fast Fourier Transform (FFT) algorithms in which the number of required mathematical operations is reduced. In one class of FFT methods, the computational burden is reduced based on the divide-and-conquer approach. The principle of the divide-and-conquer approach method is that a large problem is divided into smaller sub-problems that are easier to solve. In the FFT case, the division into sub-problems means that the input data are divided in subsets for which the DFT is computed to form partial DFTs. Then the DFT of the initial data is reconstructed from the partial DFTs. See N. W. Cooley and J. W. Tukey, "An algorithm for machine calculation of complex Fourier series", Math.Comput., Vol. 19 pp. 297–301, April 1965. There are two approaches to dividing (also called decimating) the larger calculation task into smaller calculation sub-tasks: decimation in frequency (DIF) and decimation in time (DIT).

Butterfly Implementation of the DFT

For example, an 8-point DFT can be divided into four 2-point partial DFTs as represented in FIG. 2. The basic 2-point partial DFT is calculated in a computational element called a radix-2 butterfly (or butterfly-computing element). There are butterfly computing elements corresponding to DIT and DIF implementations. Butterfly-computing elements are arranged in an array having stages of butterfly calculation. FIGS. 1 and 3 illustrate an FFT with an array architecture having one dedicated processing element for each butterfly.

As shown in FIGS. 1 and 3, data is fed to the input of the first stage 1002, 302 of butterfly-computing elements. After the first stage of butterfly-computation is complete, the result is fed to the in input of the next stage(s) 1004, 1006, 304, 306 of butterfly-computing element(s) and so on. In particular, in FIG. 3, four radix-2 butterflies operate in parallel on 8 input data points x(0)–x(7) in the first stage 302 to compute partial DFTs. The partial DFTs outputs of the first stage 302 are combined in 2 additional stages 304, 306 to form a complete 8-point DFT output data X(0)–X(7).

FIG. 4 shows a pipelined architecture implementation of the DFT. In the pipelined architecture, each row in the FFT is collapsed into one row of $\log_r N$ processing elements. In the column architecture of FIG. 2, all the stages in the FFT are collapsed into one column of N/r processing elements (PE). Assuming that a PE performs a butterfly operation in one clock cycle, the column of PEs computes one stage of the FFT for each clock cycle, and the entire FFT is computed in $\log_r N$ clock cycles.

Communication Burden

A computational problem involving a large number of calculations may be performed one calculation at a time by using a single computing element. While such a solution uses a minimum of hardware, the time required to complete the calculation may be excessive. To speed up the calculation, a number of computing elements may be used in parallel to perform all or some of the calculations simultaneously. A massively parallel computation will tend to require an excessively large number of parallel-computing elements. Even so, parallel computation is limited by the communication burden. For example, a large number of data and constants may have to be retrieved from memory over a finite capacity data bus. In addition, intermediate results in one parallel-computing element may have to be temporarily stored in memory, then later retrieved from memory and communicated to another parallel-computing element. The communication burden of an algorithm is a measure of the amount of data that must be moved (written and read) to and from memory, as well as between computing elements.

The FFT algorithm is especially memory access and storage intensive. For example, in order to compute a radix-4 DIF FFT butterfly, four pieces of data and three twiddle coefficients are read from memory, and four pieces of resultant data are written back into memory. In a prior art N point FFT calculation, there are N/r butterflies per stage (where r is the radix) for $\log_r N$ stages. Accordingly, it is desired to provide an efficient scheme by which input data, output data and twiddle coefficients are stored and retrieved from memory.

Different structures for the dedicated FFT, such as Common Factor Algorithm (CFA) [1], Prime Factor Algorithm (PFA) [1], Split Radix Algorithm (SRFT) [2], [3] and [4], Winograd Fourier Transform Algorithm (WFTA) [5] and [6], Mixed Radix Algorithm [7], cited below.

[1] T. Widhe, "Efficient Implementation of FFT Processing Elements" Linköping studies in Science and Technology, Thesis No. 619, Linköping University, Sweden, June 1997.

[2] H. V. Sorenson, M. T. Heideman, and C. S. Burrus, "On Computing the Split Radix FFT, IEEE Trans. on Acoustics, Speech, and Signal Processing, Vol. ASSP-34, No. 1, pp. 152–156, February 1986.

[3] M. Richards, "On Hardware Implementation of the Split-Radix FFT, IEEE trans. On Acoustics, Speech, and Signal Processing, Vol. ASSP-36, No. 10, pp. 1575–1581, October 1988.

[4] P. Duhamel, and H. Hollman, "Split Radix FFT Algorithm, Electronics Letters, Vol. 20, No. 1, pp. 14–16, January 1984.

[5] H. F. Silverman, "An Introduction to Programming the Winograd Fourier Transform Algorithm (WFTA)", IEEE Transactions on Acoustics, Speech and Signal Processing, Vol. ASSP-25, No. 2, pp. 152–165, April 1977.

[6] S. Winograd, "On Computing the Discrete Fourier Transform", Proc. Nat. Acad. Sci. USA, Vol. 37, pp 1005–1006, April 1976.

[7] R. C. Singleton, "An Algorithm for Computing the Mixed radix Fast Fourier Transform", IEEE Transactions on Audio and Electro-acoustics, Vol. AU-17, No. 2, PP. 93–103, June 1969.

However, none of the above FFT implementations has proposed an efficient way to access from memory the twiddle factor coefficients nor access from memory and write to memory the input and output data, respectively, in a parallel structure.

Address Generator

In an FFT implementation, an address generator is typically used to compute the addresses (locations in memory) where input data, output data and twiddle coefficients will be stored and retrieved from memory. For example, in FIG. 5 an apparatus for computing the fast Fourier transform comprises an array of radix-r butterfly processing elements 512, a memory 502 and an address generator 506. The memory 502 stores input data and twiddle coefficients used by the radix-r butterflies 512. The computed FFT output data from the radix r butterflies 512 are stored in memory 502. And input/output controller 504 controls the process of storing and retreating from memory 502.

The time required to read input data and twiddle coefficients from the memory 502, and write results back to memory 502 affects the overall time to compute the FFT. In addition to memory access time, the time required by the address generator 506 to compute the desired address itself further lengthens the overall time to compute the FFT. The design of the address generator 506 has a substantial role in determining the overall time for the computation of the FFT.

Additionally, several prior art address generator techniques have been proposed. See U.S. Pat. No. 6,035,313 to Marchant, U.S. Pat. No. 5,491,652 to Luo et al., U.S. Pat. No. 5,091,875 to Wong et al. and U.S. Pat. No. 4,899,301 to Nishitani et al.

SUMMARY OF THE INVENTION

The present invention is embodied in an address generator for use with a variety of FFT algorithms, namely the Ordered Input Ordered Output DIT and DIF algorithms such as Cooley-Tukey and Pease algorithms and could be adapted to be used with other conventional algorithms. In addition, the present address generator is adapted for use with the unique butterfly processing element used in the Jaber Fast Fourier Transform Algorithm.

In accordance with the present address generator, the r input data points and twiddle factor coefficients are accessed in a parallel structure with a single instruction, and where the r output data points are stored in a parallel structure with a single instruction. Specifically, certain storage address locations are selected so as to result in a regular repeating structure for the address generators. As a result of selecting specific address location schemes for storage of the input data, output data and twiddle coefficients, the design of the address generators are greatly simplified. In addition to simplicity of structure, the speed of the address generators is greatly increased.

In particular, by the use of the present invention, the use of multipliers in an address generator for the computation of addresses is reduced. Instead, a cascaded series of adders is used, in which the output of one adder is input to the next adder. At each stage of the cascaded adders, the same parameter of the fast Fourier transform processor is successively added. The repeated addition of such given parameter at each stage of the cascaded adders avoids the need for multipliers. The cascaded adder structure is used in the writing address generator and the reading address generator. In addition, a plurality of modulo N circuits is used in series with the cascaded series of adders to generate the twiddle coefficient addresses.

BRIEF DESCRIPTION OF THE DRAWINGS

FIG. 9 is a flowchart diagram of a software implementation of the DIT control unit in accordance with the present invention.

FIG. 10 is a block diagram of a hardware implementation of a DIT reading address generator for computing a bank of r-generated addresses in accordance with the present invention.

DETAILED DESCRIPTION

In accordance with the present embodiments, r-input data and r-coefficient multipliers are presented to the input of the CPU in a single instruction, processed in a single instruction and the r-output data stored back to the destination memory in a single instruction. Storing and accessing the coefficient multiplier and the data by a parallel structure substantially reduces the overall processing time in the execution of the FFT.

More specifically, the address generator of the present invention includes DIF and DIT reading address generators (FIGS. 9, 10, 11, 12 and 13) for computing the address in memory of locations for retrieving the r-input data. The address generator of the present invention further includes DIF and DIT coefficient address generators (FIGS. 14, 15, 16 and 17) for computing the address in memory of locations for retrieving the r-coefficient multipliers. The FFT implementation served by the address generator uses the r-input data and r-coefficient multipliers to compute the r-output data, which are the results of the FFT calculations. The address generator of the present invention further includes a writing address generator (FIGS. 6, 7 and 8) for computing the addresses of memory locations for storing the r-output data.

Writing Address Generator

The purpose of the writing address generator is to provide the memory address location in which the processed data collected from the butterfly's output is stored. In accordance with the present invention, the writing address generator has certain regularity in storing the butterfly output data for both DIT and DIF techniques. The $l^{th}$ processed PE's output $X_{(l,\ k,\ i)}$ for the $k^{th}$ word at the $i^{th}$ iteration is stored by the writing address generator into the memory address location given by:

$$A_{(l,\ k)} = l(N/r) + k \qquad (1),$$

for $l=0,1,\ldots,r-1$, and $k=0,1,\ldots,(N/r)-1$.

Figure 1:
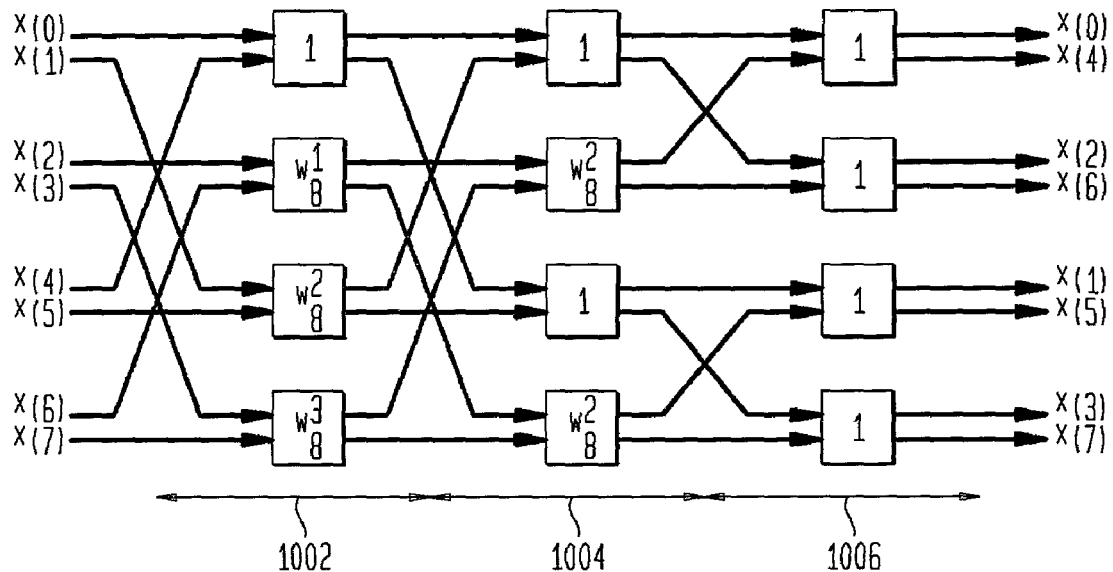
FIG. 1 is a block diagram of the 8 point radix-2 DIF FFT in accordance with the prior art.
Figure 2:
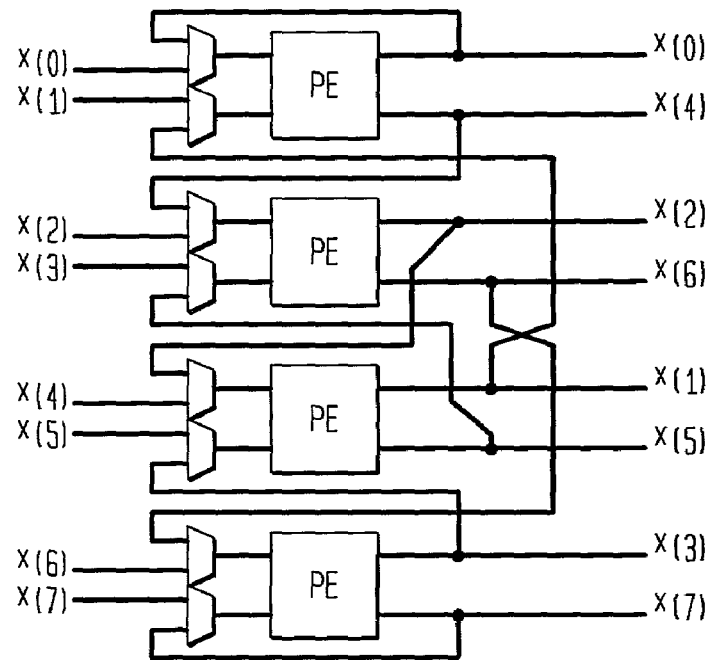
FIG. 2 is a block diagram of an 8 point radix-2 FFT having a column architecture in accordance with the prior art.
Figure 3:
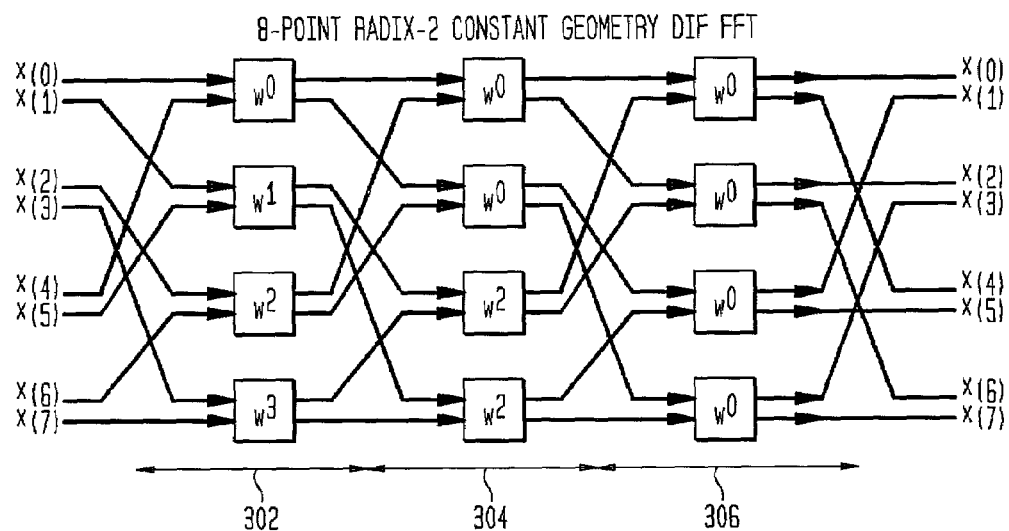
FIG. 3 is a block diagram of an alternate version of an 8 point radix-2 DIF FFT in accordance with the prior art.
Figure 4:
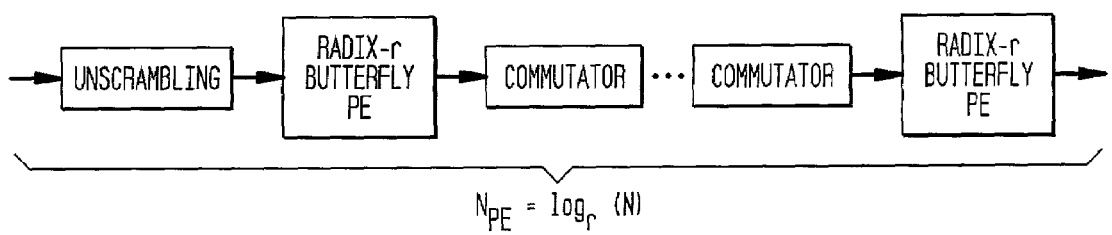
FIG. 4 is a block diagram of a fast Fourier transform processor having a pipelined architecture in accordance with the prior art.
Figure 5:
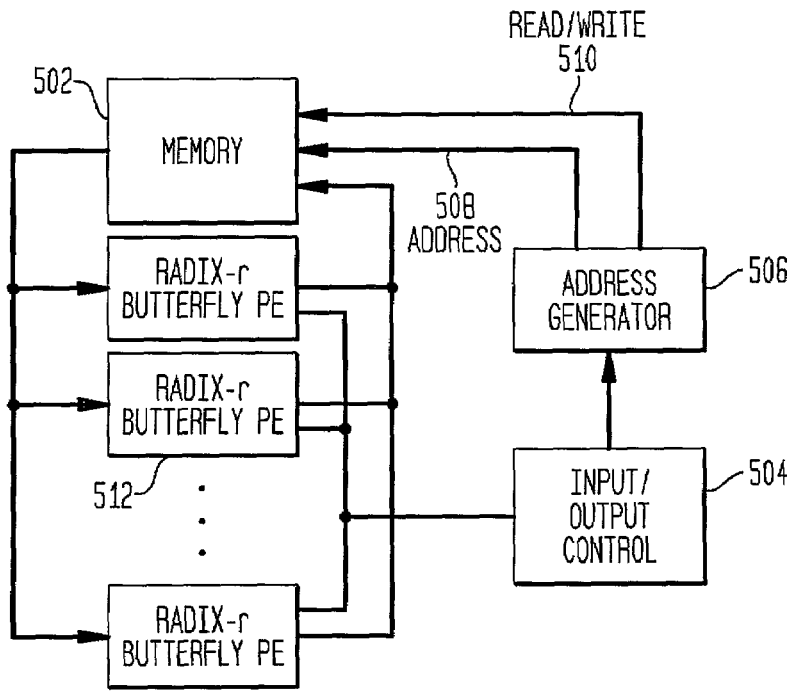
FIG. 5 is a block diagram of a radix-r FFT having a column architecture, a shared memory and an address generator in accordance with the prior art.
Figure 6:
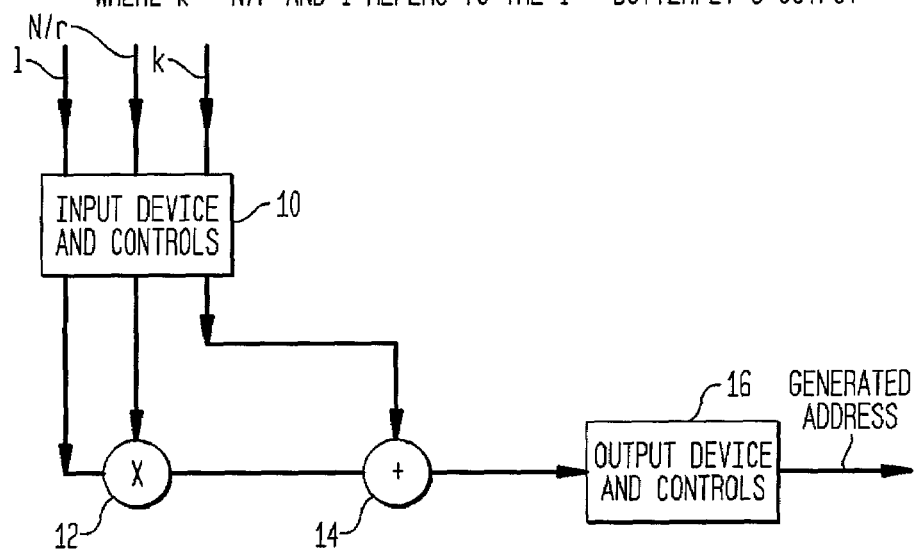
FIG. 6 is a block diagram of a writing address generator for generating one output address in accordance with the present invention.

FIG. 6 shows the hardware implementation of the single output writing address generator that is used in a multiple input, single output system, such as the modified radix-r engine. The writing address generator comprises an input device and controls circuit 10, an output device and controls circuit 16, a multiplier 12 and an adder 14.

In operation, the inputs l, N/r and k (where N is the data block size and r is the radix) are received by the input device and control buffers 10. The input device and controls 10 provides signal buffering, temporary storage and timing. The product of N/r and l is provided at the output of multiplier 12 and added to k in adder 14 to achieve the result of equation 1, above. The output device and controls 16 provides signal buffering, temporary storage and timing. The output device and controls circuit 16 receives the output of adder 14, which is the generated address for the computed FFT output data in memory.

Figure 7:
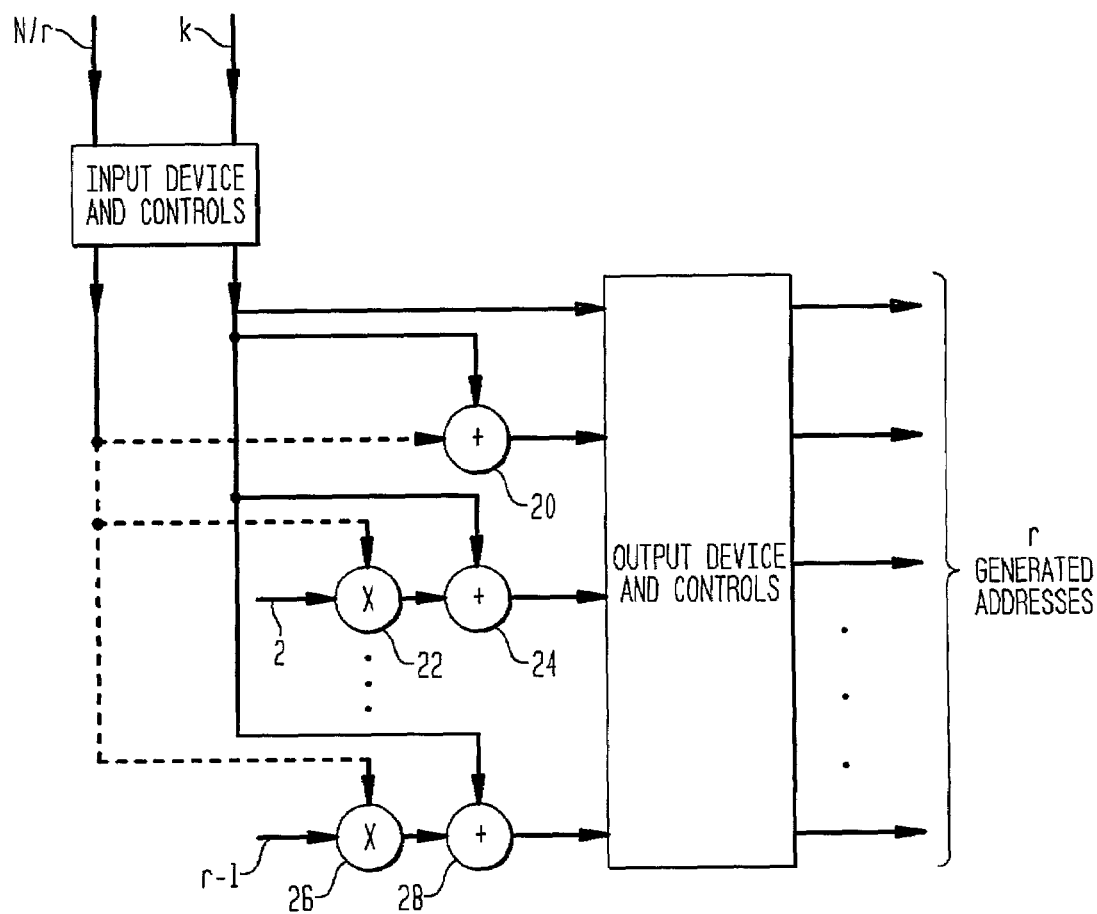
FIG. 7 is a block diagram of a writing address generator for computing a bank of r-generated addresses in accordance with the present invention.

FIG. 7 illustrates the parallel structure of the r-output address generator that is used in a multiple input, multiple output system, where r-output data are stored in their specific memory address location by mean of two successive simple arithmetical operations. This embodiment of FIG. 7 may be used with any of the proposed Ordered Input Ordered Output radix-r butterfly designs. The writing address generator comprises an input device and controls circuit, an output device and controls circuit, a plurality of multipliers 22. 26 and a plurality of adders 20, 24, 28.

In operation, the input device and control buffers receive the inputs N/r and k. The factor l is not a direct input in FIG. 7, but is implied from the structure of the block diagram. That is, for l=0, k is output to the output device and controls circuit. For l=1, adder 20 outputs k+N/r to the output device and controls circuit. One input to multiplier 22 is N/r. The other input to multiplier 22 is 2. Thus, for l=2, adder 24 outputs k+2N/r to the output device and controls circuit. One input to multiplier 26 is N/r. The other input to multiplier 26 is r−1. Thus, for l=r−1, adder 28 outputs k+(r−1)N/r to the output device and controls circuit and thus provides r generated address.

Figure 8:
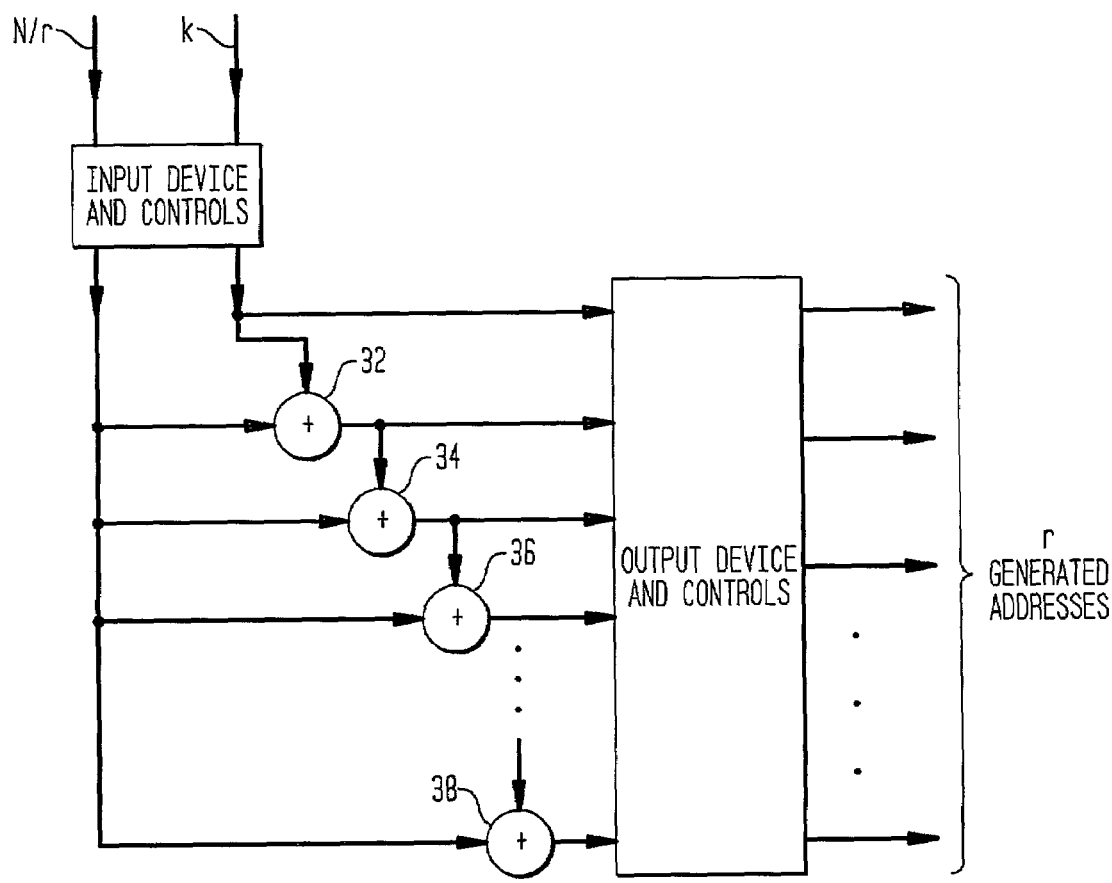
FIG. 8 is a block diagram of an alternate embodiment of a writing address generator for computing a bank of r-generated addresses in accordance with the present invention.

An alternative implementation for the writing address generator of FIG. 7 is shown in FIG. 8. The advantage of the embodiment in FIG. 8 is that the multipliers shown in the embodiment of FIG. 7 are avoided. The implementation of multipliers in an integrated circuit requires more space on the silicon surface of the chip as compared to adders. Since the size of the DSP chip is a major concern, the substitution of adders for multipliers is a significant advantage. The writing address generator of FIG. 8 uses a plurality of adders 32,34,36, 38.

In operation, the input device and control buffers receive the inputs N/r and k. The factor l is not a direct input in FIG. 8, but is implied from the structure of the block diagram. That is, for l=0, k is output to the output device and controls circuit as the first generated address. For l=1, adder 32 outputs k+N/r to the output device and controls circuit as the second generated address. One input to adder 34 is N/r. The other input to adder 34 is the output of adder 32. Adder 34 adds the same N/r to the previously generated address. Thus, for l=2, adder 34 outputs k+2N/r to the output device and controls circuit as the third generated address.

One input to adder 36 is N/r. The other input to adder 36 is the output of adder 34 (k+2N/r). Thus, for l=3, adder 36 adds N/r to the previously generated output address and outputs k+3N/r to the output device and controls circuit as the fourth generated address. Finally, the last adder 38 outputs k+(r−1)N/r to the output device and controls circuit and thus provides r generated address.

Adders 32, 34, 36, 38 are arranged in a cascaded series of adders, in which the output of one adder is input to the next adder. At each stage of the cascaded adders, the same parameter of the fast Fourier transform processor, i.e., term N/r is successively added.

The operation of cascaded adders 32, 34, 36, 38 is very rapid, particularly if operated asynchronously. With each successive adder, the same N/r is added to the previous generated address and so on until the last adder 38 outputs the last of the bank of r generated addresses.

Dit & Dif Reading Address Generator

The main role of the reading address generator is to provide the memory address location from which the data are collected and fed to the butterfly's input in order to be processed. As in the case of the write address generator, the read address generators operate independently of the CPU on the DSP. Direct Memory Access (DMA) is the ability of an I/O subsystem to transfer data to and from a memory subsystem without central processor intervention. A DMA Controller is a device that can control data transfers between an I/O subsystem and a memory subsystem in the same manner that a central processor can control such transfers. Direct Memory Access is a simple form of bus mastering where the I/O device is set up by the CPU to read from or write to one or more contiguous blocks of memory and then signal to the CPU when it has done so. Full bus mastering (or "First Party DMA", "bus mastering DMA") implies that the I/O device is capable of performing more complex sequences of operations without CPU intervention. A higher level DMA controller requires that the I/O device contains its own processor or microcontroller.

The address generators of the present invention use memory controls, including address buses, data lines and memory write and memory read control lines, and are thus the equivalent of a direct memory accesses (DMA) controller for background off-chip data accesses to help optimizing an application's use of memory.

Ordered Input Ordered Output DIT Reading Address Generator

For this version of the FFT, the $m^{th}$ PE's input $x_{(m)}$ of the $k^{th}$ word at the $i^{th}$ iteration is fed by the reading address $r_{m_{(k,i)}}$:

$$r_{m_{(k,i)}} = m \times \left(\frac{N}{r^{(i+1)}}\right) + ((k))_{r^{n-i}} + \tilde{N}\left(\frac{k}{r^{(n-i)}}\right) \times r^{(n+1-i)} \quad (2)$$

for m=l=0,1, . . . , r−1, and the $l^{th}$ processed PE's output $X_{(l, k, i)}$ for the $k^{th}$ word at the $i^{th}$ iteration is stored by the writing address generator $A_{(l, k)}$ derived by Equation (1).

For the first iteration (i.e. i=0) equation (2) will be equal to equation (1) because the second term of this equation will be equal to k and the third term will be equal to zero therefore, for the first iteration the reading and writing address generator will have the same structure.

Computing the Modulo (M) and Integer (I) of a given ratio of two numbers dominate the workload in the reading address generator and coefficient address generator. The expression $((A))_B$ denotes A modulo B, which is equal to the residue (remainder) of the division of A by B and $\tilde{N}$ (A/B), denotes the quotient (Integer Part) of the division of A by The arithmetical operation modulo, in hardware implementation is represented by a resetable counter. During each stage (iteration) k words (k=N/r) has to be processed, therefore, the third term of equation (2) is a function of $r^i$ and could be replaced by the arithmetical operation modulo. In fact, since k varies between 0 and ((N/r)−1), therefore, $$\tilde{N}\left(\frac{k}{r^{(n-i)}}\right) = I(r^i), \quad (3)$$

will vary between 0 and $(r^{(i)})$−1. As a result, the integer part operation in equation (2) will be simplified as follow:

$$\tilde{N}\left(\frac{k}{r^{(n-i)}}\right) = ((I))_{r^{(i)}}, \quad (4)$$

for I=0, 1, . . . , $(r^{(i)})$−1, i=0, 1, . . . , n, and n=$\log_r$ N−1.

The flowchart of the DIT control unit, which is responsible in providing parameters M and I to the DIT reading address generator, is illustrated in FIG. 9. As shown in FIG. 9, the process is implemented by mean of three resetable and programmable counters 910, 912, 914. The purpose of the flow chart program of the DIT control unit in FIG. 9 is to compute the modulo (M) and integer (I) function for FIGS. 10 and 11.

An embodiment of the DIT reading address generator is shown in FIG. 10. The reading address generator of FIG. 10 uses a single multiplier 42 and a plurality of adders 44, 46, 48, 50.

In operation, $r^{(n+l-i)}$ is multiplied by I in multiplier 42. The output of multiplier 42 (I $r^{(n+1-i)}$), M and N/$r^{(i+1)}$ is received in the input device and controls buffer. Adder 44 receives M on one input thereto and the output of multiplier 42 (I $r^{(n+1-i)}$) on the other input thereto to provide a first generated address. The value of N/$r^{(i+1)}$ is added to the output of adder 44 in adder 46 to provide a second generated address. The value of N/$r^{(i+1)}$ is added to the output of adder 46 in adder 48 to provide a second generated address, and so on until adder 50 provides the last of the generated bank of r generated address. A single multiplier 42 provides an input for all the cascaded adders 44, 46, 48, 50.

The operation of cascaded adders 44, 46, 48, 50 is very rapid, particularly if operated asynchronously. With each successive adder, the same term N/$r^{(i+1)}$ (a parameter of the fast Fourier transform processor) is added to the previous generated address and so on until the last adder 50 outputs the last generated address of the bank of r generated addresses.

Figure 11:
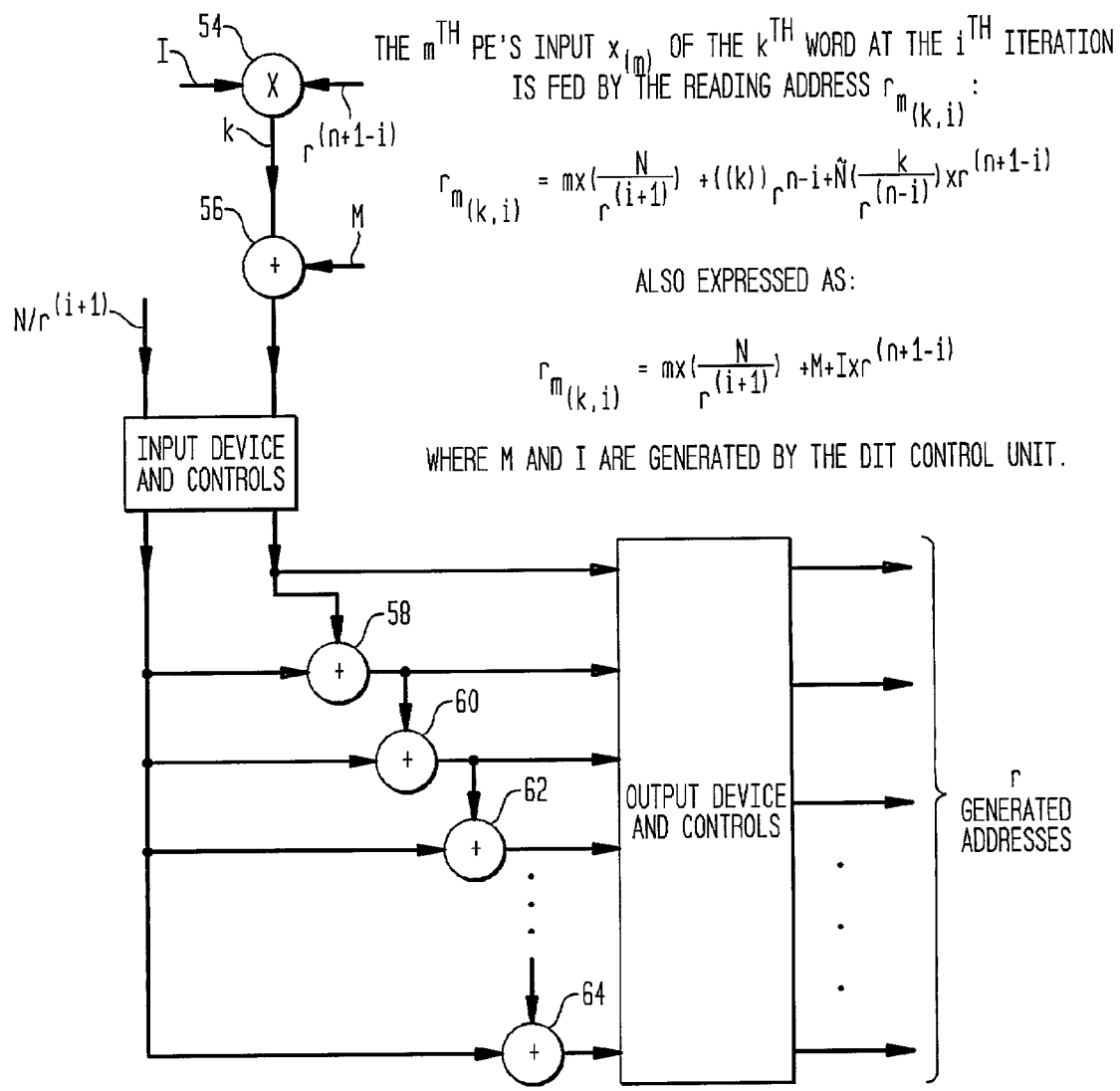
FIG. 11 is an alternate embodiment of a block diagram of a DIT reading address generator for computing a bank of r-generated addresses in accordance with the present invention.

An advantageous hardware implementation of the DIT reading address generator is shown in FIG. 11. The DIT reading address generator of FIG. 11 permits a reduction of hardware within the DSP chipset, because it has a similar structure to the DIT writing address generator of FIG. 8. That is, because the DIT reading address generator of FIG. 11 has a common structure with the writing address generator of FIG. 8, the same hardware may be shared for both functions. Thus, if the DIT reading address generator of FIG. 11 is used, it is not necessary to have a separate DIT writing address generator.

The DIT reading address generator of FIG. 11 includes a single multiplier 54 and adders 56, 58, 60, 62, 64. In operation, $r^{(n+1-i)}$ is input to multiplier 54 where it is multiplied by I. The output of multiplier 54 is added together with M in adder 56. The output of adder 56 is the first generated address, which is also an input to adder 58. The other input to adder 58 is $N/r^{(i+1)}$. The output of adder 58 is the second generated address. The output of adder 58 is an input to adder 60. The other input to adder 60 is $N/r^{(i+1)}$. The output of adder 60 is the third generated address. The output of adder 60 is input to adder 62. The other input to adder 62 is $N/r^{(i+1)}$. The output of adder 62 is the fourth generated address.

Adders 58, 60, 62, 64 are arranged in a cascaded series of adders, in which the output of one adder is input to the next adder. At each stage of the cascaded adders, the same term, $N/r^{(i+1)}$ (a parameter of the fast Fourier transform processor) is successively added. The operation of cascaded adders 58, 60, 62, 64 is very rapid, particularly if operated asynchronously. With each successive adder, the same term $N/r^{(i+1)}$ is added to the previous generated address and so on until the last adder 64 outputs the last generated address of the bank of r generated addresses.

The Ordered Input Ordered Output DIF Address Generator

Similar to the DIT FFT, the input sequences for DIF FFT are fed to the PE's input by the following reading address generator:

$$r_{m(k,i)} = m \times (N/r) + k \text{ for } i=0 \quad (5),$$

and $$r_{m(k,i)} = m \times \frac{N}{r^2} + \left(\left(\tilde{N}\left(\frac{k}{r^{i-1}}\right) \times \frac{N}{r}\right)\right)_N + \quad (6)$$

$$((k))_{,i-1} + \tilde{N}\left(\frac{k}{r^i}\right) \times r^{i-1}$$

for $i > 0$, for $m=l=0,1,\ldots,r-1$, and the $l_{th}$ processed PE's output $X_{(l, k, i)}$ for the $k_{th}$ word at the $i^{th}$ iteration is stored by the writing address generator $A_{(l, k)}$ derived by Equation (1). Similarly for the DIT structure and for the first iteration the DIF reading and writing address generators will have the same structure.

Figure 13:
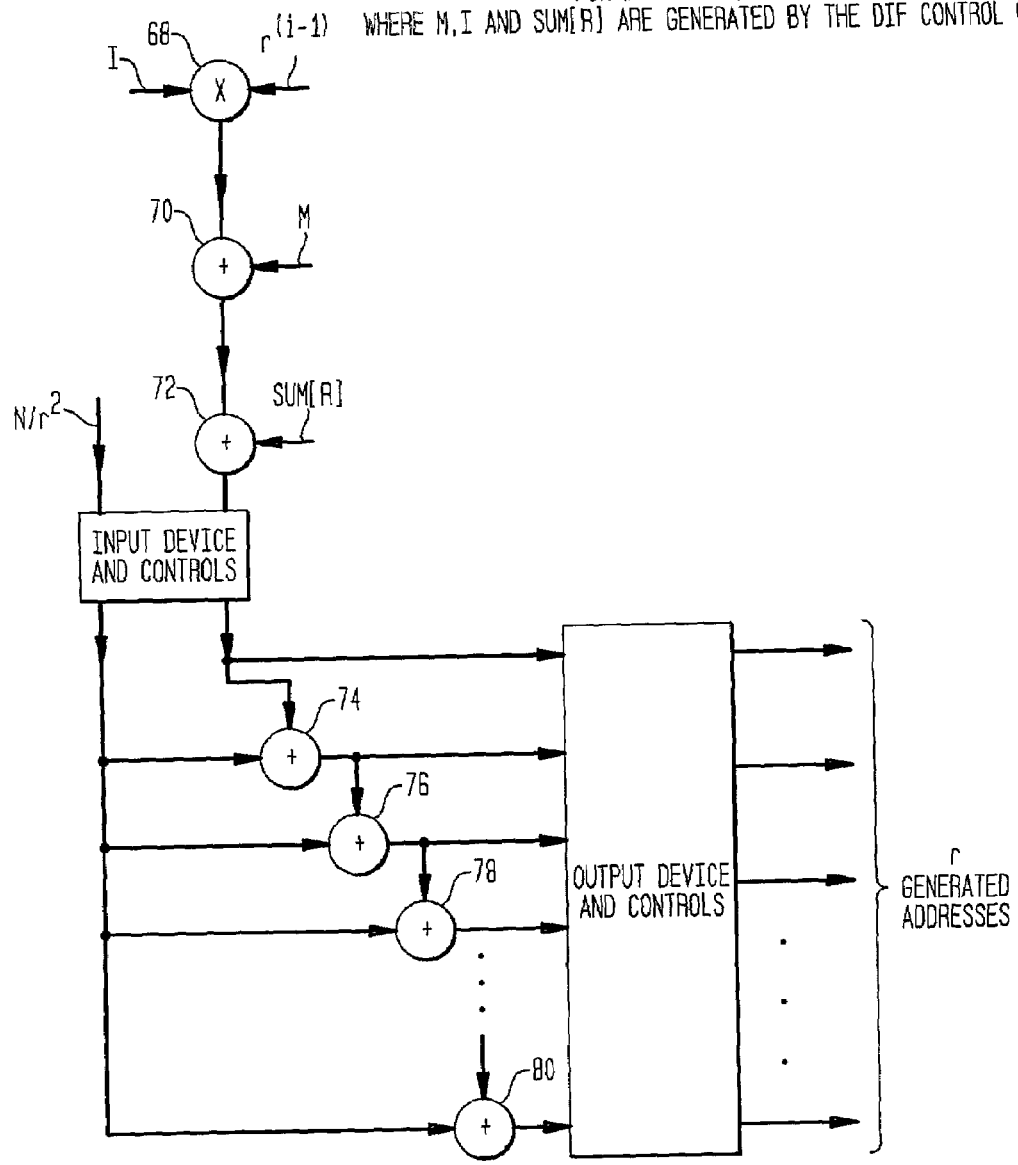
FIG. 13 is a block diagram of the DIF reading address generator for computing a bank of r-generated addresses in accordance with the present invention.

The DIF reading address generator of FIG. 13 permits a reduction of hardware within the DSP chipset, because it has a similar structure to the DIF (same as for DIT) writing address generator of FIG. 8. That is, because the DIF reading address generator of FIG. 13 has a common structure with the writing address generator of FIG. 8, the same hardware may be shared for both functions. If the DIF reading address generator of FIG. 13 is used, it is not necessary to have a separate writing address generator.

Figure 12:
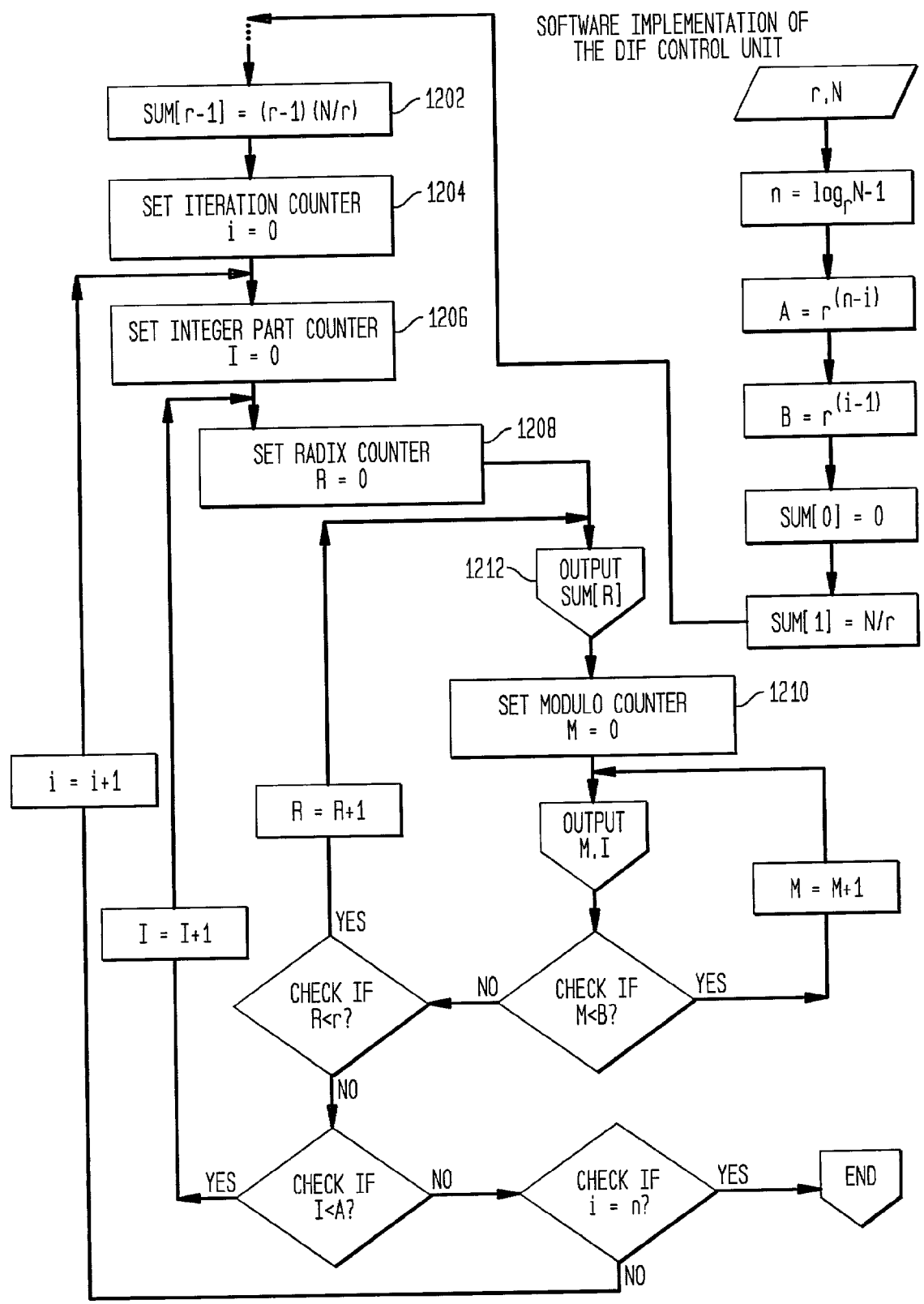
FIG. 12 is a flowchart diagram of a software implementation of the DIF control unit in accordance with the present invention.
Figure 17:
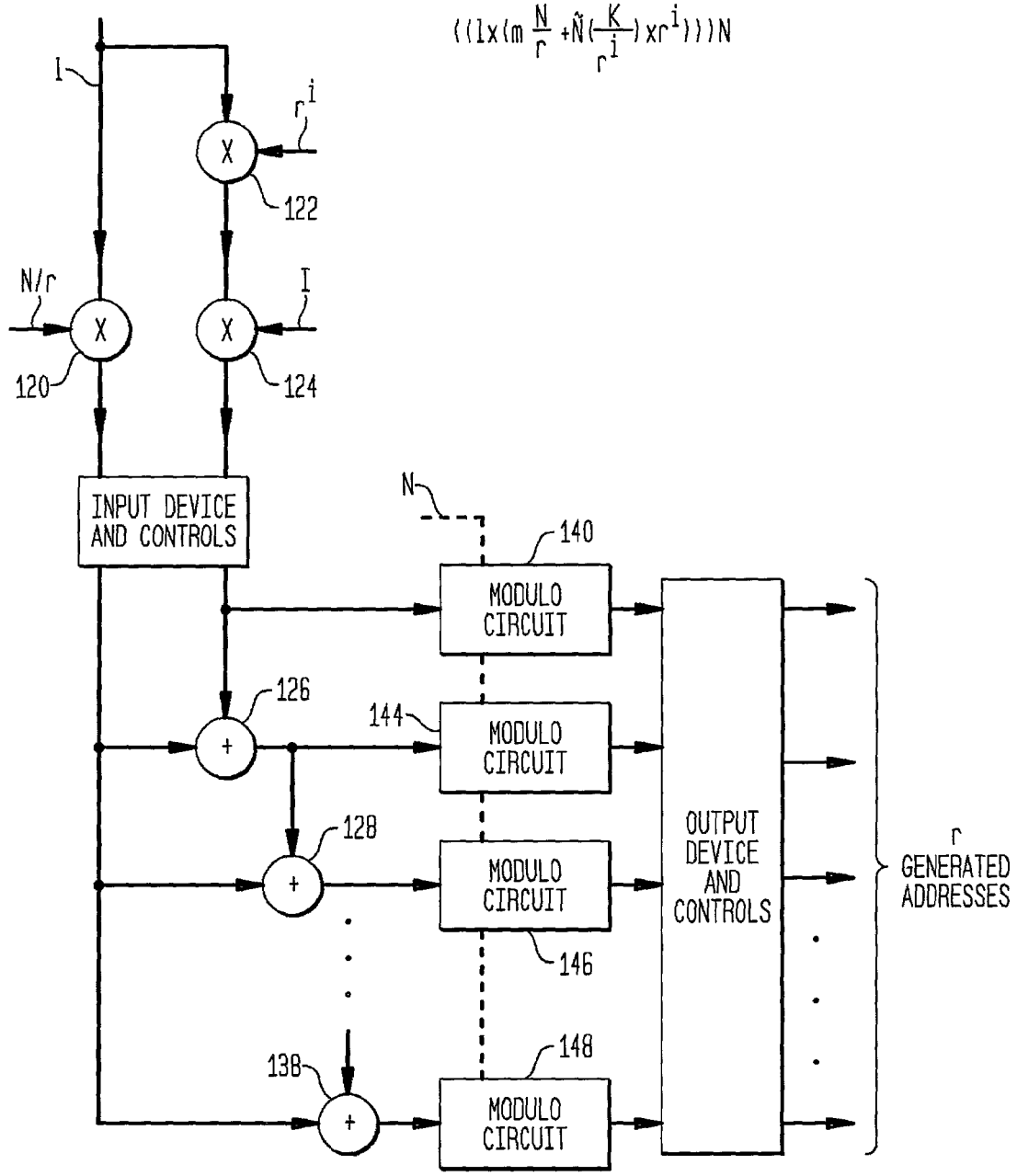
FIG. 17 is a block diagram of a DIF coefficient address generator for computing a bank of r-generated addresses in accordance with the present invention.

The flowchart of the DIF control unit, which is responsible in providing I, M and Sum[R] parameters to the DIF reading address generator in FIG. 13, and the DIF twiddle factor address generator in FIG. 17, is illustrated in FIG. 12. As shown in FIG. 12, the DIF control process is implemented by mean of four resetable and programmable counters 1204, 1206, 1208, 1210 which control the data flow of the input data by providing the I, M and Sum[R] parameters 1212 to the DIF reading address generator (FIG. 13). In terms of complexity, as compared to the DIT control unit in FIG. 9, the DIF control unit in FIG. 12 is slightly more complex (one additional Radix counter 1208 which accumulates Sum[R]). Also the DIF reading address generator in FIG. 13 has one additional adder 72, as compared to the DIT reading address generator in FIG. 10.

The DIT reading address generator of FIG. 13 includes a single multiplier 68 and adders 72, 74, 76, 78, 80. In operation, $r^{(i-1)}$ is input to multiplier 68 where it is multiplied by I. The output of multiplier 68 is added to M in adder 70. The output of adder 70 is further added to Sum[R] in adder 72. Sum[R], M and I are generated by the flowchart of FIG. 12.

The output of adder 72 is the first generated address, which is also input to adder 74. The other input to adder 74 is $N/r^2$. The output of adder 74 is the second generated address. The output of adder 74 is input to adder 76. The other input to adder 76 is $N/r^2$. The output of adder 76 is the third generated address. The output of adder 76 is input to adder 78. The other input to adder 78 is $N/r^2$. The output of adder 78 is the fourth generated address Adders 74, 76, 78, 80 are arranged in a cascaded series of adders, in which the output of one adder is input to the next adder. At each stage of the cascaded adders the same $N/r^2$ term (parameter of the fast Fourier transform processor) from multiplier 72 is successively added. The operation of cascaded adders 74, 76, 78, 80 is very rapid, particularly if operated asynchronously. With each successive adder, the same $N/r^2$ term is added to the previous generated address and so on until the last adder 80 outputs the last generated address of the bank of r generated addresses.

The Coefficient Address Generator

The main role of the coefficient address generator is to provide the memory address location from which the coefficient data (twiddle factors) are retrieved from memory and send the twiddle factors to the butterfly's multipliers input in order to be processed in accordance with the FFT algorithm.

Figure 14:
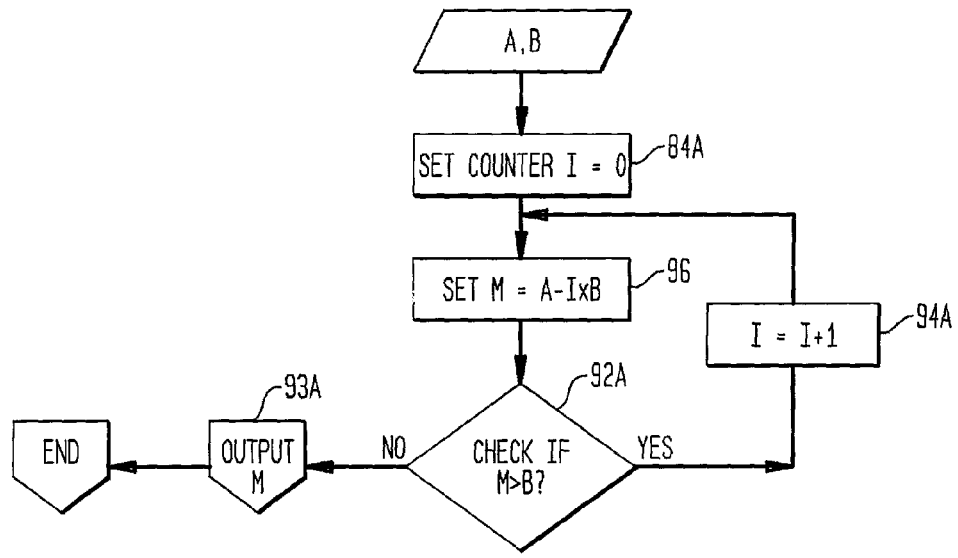
FIG. 14 is a software implementation of a modulo circuit function for use in conjunction with the present invention.
Figure 15:
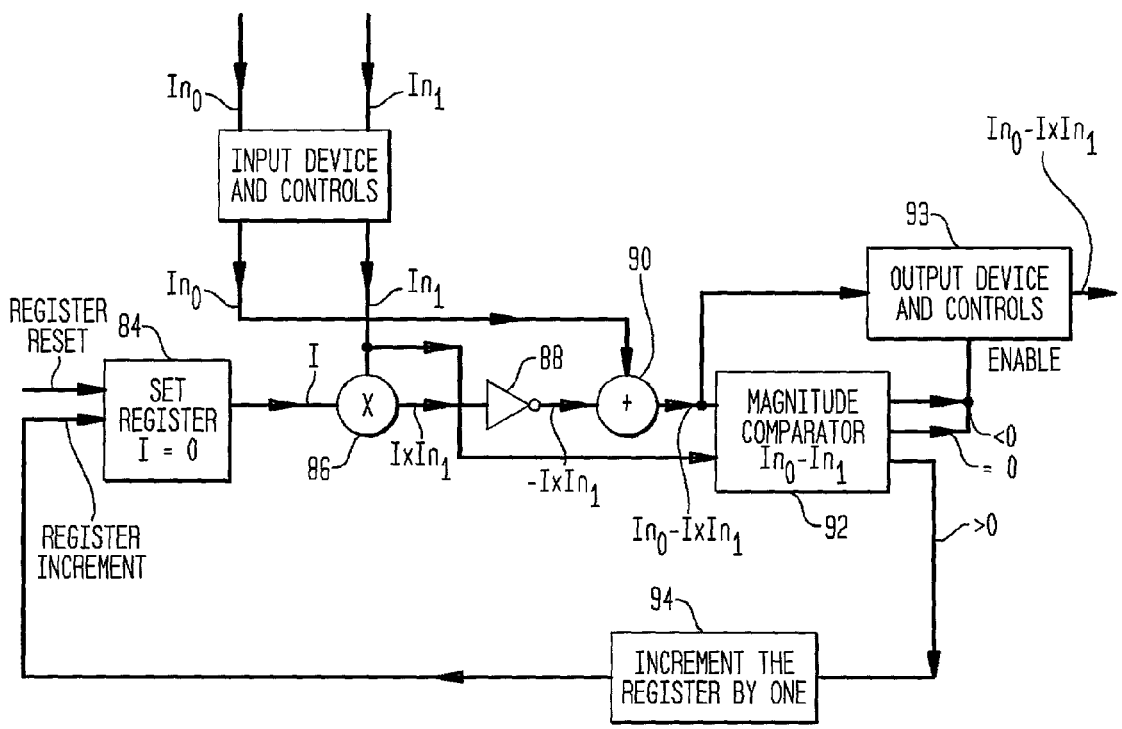
FIG. 15 is a block diagram of a modulo circuit for use in conjunction with the present invention.

Modulo Operation (FIGS. 14 and 15)

A modulo operation is required in the hardware implementation for the DIT coefficient address generator (FIG. 16) and in the DIF coefficient address generator (FIG. 17). The modulo operation is implemented in accordance with the flow chart process of FIG. 14. As shown in FIG. 14, the process includes a resetable counter 84A, a magnitude check on the M bits 92A and a check the sign bit of the output register 93A (output M) containing the result of the operation M.

FIG. 15 is a block diagram illustrating the hardware implementation of the modulo function. The circuit of FIG. 15 computes the modulo function of two inputs, $In_0$ and $In_1$. Register 84 is initially reset. $In_1$ is multiplied by the contents of register 84 in multiplier 84. The result is inverted in amplifier 88 and then summed with $In_0$ in signed adder 90 and coupled to a magnitude comparator 92. The other input of magnitude comparator 92 is coupled to $In_1$. If the output of magnitude comparator 92 indicates greater than zero, then register 84 is incremented and the process repeated. The process of incrementing register 84 is continued until the output of magnitude comparator 92 indicates zero or less, at which point the modulo calculation is complete. Register 84 contains the Integer (I), and the final subtraction, $In_0 - I \, In_1$ is the Modulo (M) output 93.

Figure 16:
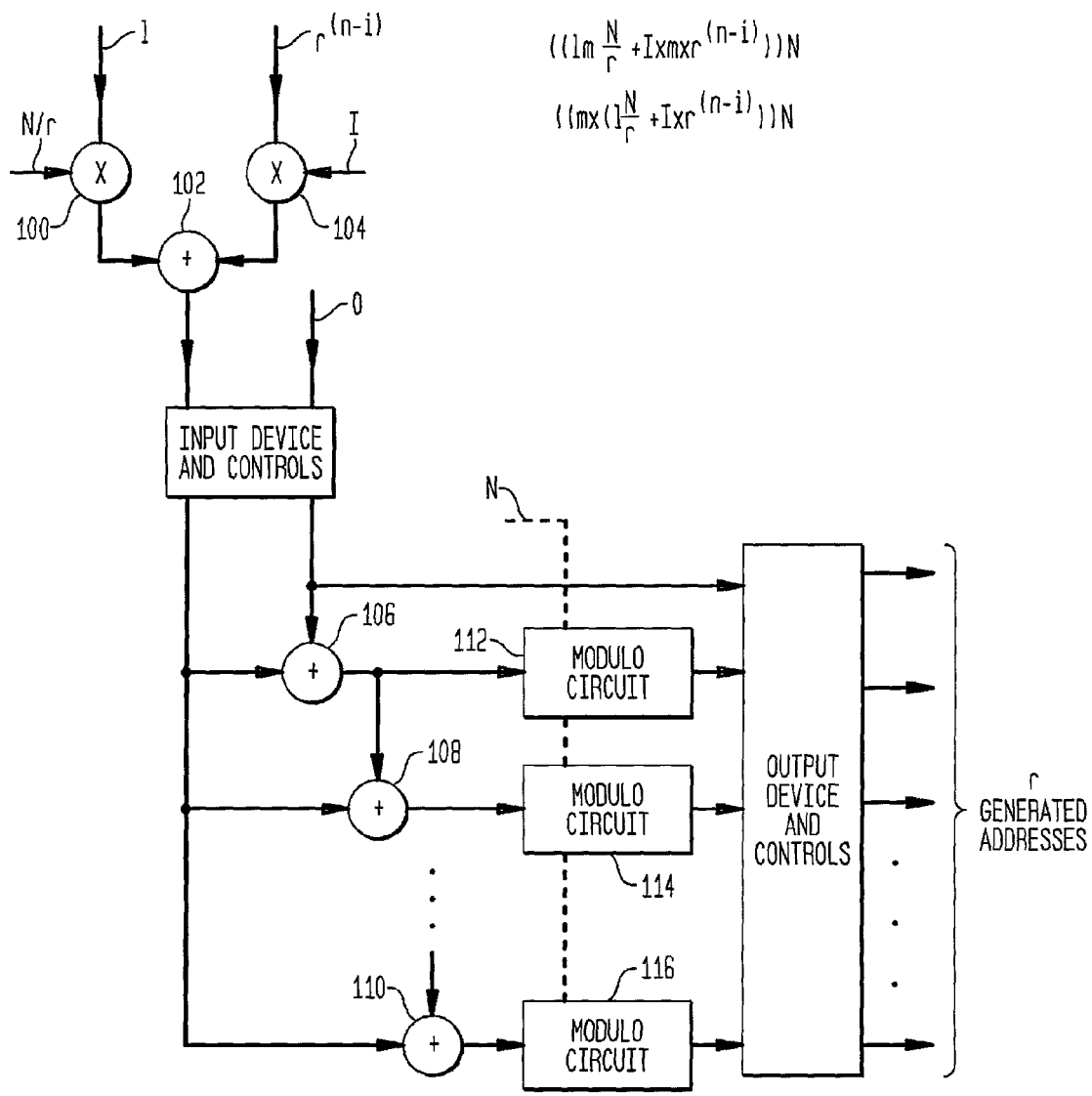
FIG. 16 is a block diagram of a DIT coefficient address generator for computing a bank of r-generated addresses in accordance with the present invention.

The DIT Coefficient Address Generator (FIG. 16)

FIG. 16 is a block diagram illustrating the hardware implementation of the DIT coefficient address generator. The address generator may be either internal to the DSP chipset or externally implemented on a board level product. For each word (a set of r points data) introduced to the DIT butterfly's PE input, a set of r twiddle factors are retrieved from memory. Alternatively, for the inventor's disclosed FFT butterfly in U.S. patent application Ser. No. 09/768812, filed Jan. 24, 2001 published as PCT/US01/02293, for each word (a set of r points data) introduced to the DIT butterfly's PE input, a set of $r^2$ twiddle factors are retrieved from memory.

The memory address locations of the twiddle factors (which are used as coefficients or multipliers in the DIT butterfly computation) are provided by the following expression:

$$\left(\left(lm\frac{N}{r} + \tilde{N}\left(\frac{K}{r^{(n-i)}}\right)mr^{(n-i)}\right)\right)_N \quad (7)$$

which could be simplified as follow:

$$\left(\left(m\times\left(l\frac{N}{r} + \tilde{N}\left(\frac{k}{r^{(n-i)}}\right)\times r^{(n-i)}\right)\right)\right)_N, \quad (8)$$

$$\left(\left(m\times\left(l\frac{N}{r} + I\times r^{(n-i)}\right)\right)\right)_N \quad (9)$$

where I is the computed value of the integer part operation by the control unit of the DIT reading address generator and l=m=0, 1, . . . , r−1 and k=0, 1, . . . , (N/r)−1 and I=0, 1, . . . , $r^i$−1.

The DIT coefficient address generator in FIG. 16 comprises two multipliers 100, 104 and a plurality of adders 102, 106, 108, and 110. In addition, a plurality of modulo N circuits 112, 114, 116 is provided.

In operation, N/r is input to multiplier 100 where it is multiplied by I. Furthermore, $r^{(n-i)}$ is input to multiplier 104 where it is multiplied by I. The output of multiplier 100 is added to the output of multiplier 104 and adder 102 and forms an output term equal to the right hand side of the equation 9.

The first generated address is equal to zero. The output of multiplier 102 is added to zero in adder 106, the output of which is connected to modulo N circuit 112. The output of modulo N circuit 112 is the second generated address. The output of adder 106 is also input to adder 108. The other input to adder 108 is the output of adder 102 (equal to the right hand side of equation 9). The output of adder 108 is input to modulo N circuit 114, the output of which is the third generated address. With each successive adder, the same output term (a parameter of the fast Fourier transform processor) from adder 102 is added to the previous sum and so on until the last adder 110 and modulo N circuit 116, which outputs the last of the bank of r generated addresses.

Adders 106, 108, 110 are arranged in a cascaded series of adders, in which the output of one adder is input to the next adder. At each stage of the cascaded adders, the same term (a parameter of the fast Fourier transform processor) from the output of adder 102 is successively added. The operation of cascaded adders 106, 108, 110 is very rapid, particularly if operated asynchronously.

The DIF Coefficient Address Generator (FIG. 17)

Similarly to the DIT technique, for each word (a set of r points data) introduced to the DIT butterfly's PE input, a set of r twiddle factors is generated. Alternatively, for the inventor's disclosed FFT butterfly in U.S. patent application Ser. No. 09/768812, filed Jan. 24, 2001 published as PCT/US01/02293, for each word (a set of r points data) introduced to the DIF butterfly's PE input, a set of $r^2$ twiddle factors are retrieved from memory.

The memory address location of the twiddle coefficients is provided by the following expression:

$$\left(\left(lm\frac{N}{r} + \tilde{N}\left(\frac{K}{r^i}\right)lr^i\right)\right)_N, \quad (10)$$

which could be simplified as follow:

$$\left(\left(l\times\left(m\frac{N}{r} + \tilde{N}\left(\frac{k}{r^i}\right)\times r^i\right)\right)\right)_N, \quad (11)$$

$$\left(\left(m\times\left(l\frac{N}{r} + I\times r^{(n-i)}\right)\right)\right)_N, \quad (12)$$

where I is the computed value of the integer part operation by the control unit of the DIF reading address generator and l=m=0, 1, . . . , r−1 and k=0, 1, . . . , (N/r)−1 and I=0, 1, . . . , $r^{(n-i)}$−1.

The DIF coefficient address generator in FIG. 17 comprises three multipliers 120, 122, 124 and a plurality of adders 126, 128, 138. In addition, a plurality of modulo N circuits 140, 144, 146, 148 is provided.

In operation, N/r is input to multiplier 120 where it is multiplied by l. Furthermore, $r^i$ is input to multiplier 122 where it is also multiplied by l. The output of multiplier 122 is is further multiplied by I in multiplier 124. The output of multiplier goes to modulo N circuit 140. Thus, the first generated address is equal to modulo N of the output of multiplier 124. The output of multiplier 124 (1 $r^i$ I) is multiplied by the output of multiplier 120 (1 N/r) in multiplier 126. The output of multiplier 126 is connected to modulo N circuit 140. The output of modulo N circuit 144 is the second generated address.

The output of adder 126 is also an input to adder 128. The other input to adder 128 is the output (1 N/r) of multiplier 120. The output of adder 128 is input to modulo N circuit 146, the output of which is the third generated address. With each successive adder, the same term (a parameter of the fast Fourier transform processor) from multiplier 120 is added to the previous sum and so on until the last adder 138 and modulo N circuit 148, which outputs the last of the bank of r generated addresses.

Adders 126, 128 and 138 are arranged in a cascaded series of adders, in which the output of one adder is input to the next adder. At each stage of the cascaded adders, the same term (a parameter of the fast Fourier transform processor) from the output of multiplier 120 is successively added to the previous summation.

DIT and DIF Coefficient Address Generator for a Conventional Butterfly

The DIT & DIF address generator could be adapted for implementation on any of the existing conventional butterfly (DIT and DIF structures), yielding to simplified hardware architecture for those address generators. The term lm(N/r) in equations (7) and (10) are set to zero for use with conventional DIT or DIF butterflies.

Figure 18:
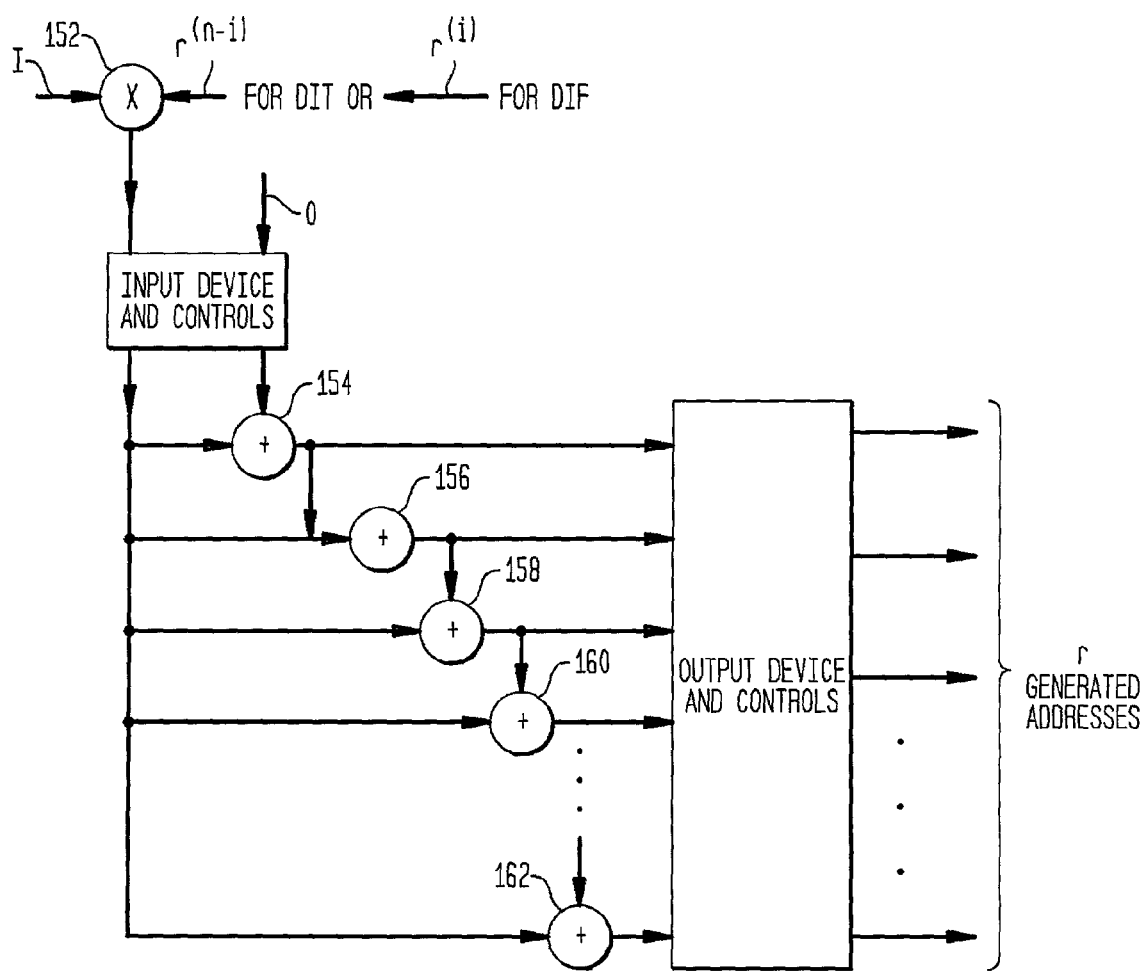
FIG. 18 is a block diagram of a DIT or DIF coefficient address generator for use in conjunction with a conventional DIT or DIF butterfly for computing a bank of r-generated addresses in accordance with the present invention.

An embodiment of the conventional DIT and DIF reading coefficient address generator is shown in FIG. 18. The coefficient address generator of FIG. 18 uses a single multiplier 152 and a plurality of adders 154, 156, 158, 160, 162.

In operation, $r^{(n-i)}$ ($r^{(i)}$ for DIF) is multiplied by I in multiplier 152. The output of multiplier 152 is received in the input device and controls buffer. Adder 154 receives 0 on one input thereto and the output of multiplier 152 of $\text{Ir}^{(n-i)}$ ($\text{Ir}^{(i)}$ for DIF) on the other input to provide a first generated address. The value of $\text{Ir}^{(n-i)}$ ($\text{Ir}^{(i)}$ for DIF) is added to the output of adder 154 in adder 156 to provide a second generated address. The value of $\text{Ir}^{(n-i)}$ ($\text{Ir}^{(i)}$ for DIF) is added to the output of adder 156 in adder 158 to provide a third generated address The value of $\text{Ir}^{(n-i)}$ ($\text{Ir}^{(i)}$ for DIF) is added to the output of adder 158 in adder 160 to provide a fourth generated address, and so on until adder 162 provides the last of the generated bank of r generated address. A single multiplier 152 provides an input for all the cascaded adders 154, 156, 158, 160, 162

Adders 154, 156, 158, 160, 162 are arranged in a cascaded series of adders, in which the output of one adder is input to the next adder. At each stage of the cascaded adders, the same term (a parameter of the fast Fourier transform processor) from the output of multiplier 152 is successively added.

The operation of cascaded adders 154, 156, 158, 160, 162 is very rapid, particularly if operated asynchronously. With each successive adder, the same parameter of the fast Fourier transform processor, i.e., term ($\text{Ir}^{(n-1)}$) for DIT (and term $\text{Ir}^i$ for DIF) is added to the previous generated address and so on until the last adder 162 outputs the last generated address of the bank of r generated addresses.

Appendix

The JFFT Algorithms

The definition of the DFT is shown in equation (1), $x_{(n)}$ is the input sequence, $X_{(k)}$ is the output sequence, N is the transform length and $W_N$ is the $N^{th}$ root of unity ($W_N = e^{-j2\pi/N}$). Both $x_{(n)}$ and $X_{(k)}$ are complex valued sequences.

$$X_{(k)} = \sum_{n=0}^{n=N-1} x_{(n)} w_N^{nk}, k \in [0, N-1]. \tag{1}$$

From equation (1) it can be seen that the computational complexity of the DFT increases as the square of the transform length, and thus, becomes expensive for large N. This method, which is known as fast algorithms for DFT computation, is based on a divide-and-conquer approach. The principle of this method is that a large problem is divided into smaller sub-problems that are easier to solve. In the FFT case, the division into sub-problems means that the input data $x_n$ are divided into subsets on which the DFT is computed. Then the DFT of the initial data is reconstructed from these intermediate results. IF this strategy is applied recursively to the intermediate DFTs, an DFT algorithm is obtained.

The basic operation of a radix-r butterfly PE is the so-called butterfly in which r inputs are combined to give the r outputs via the operation:

$$X = B_r \times x \tag{2},$$

where $x = [x_{(0)}, x_{(1)}, \ldots, x_{(r-1)}]^T$ is the input vector and $X = [X_{(0)}, X_{(1)}, \ldots, X_{(r-1)}]^T$ is the output vector.

$B_r$ is the r×r butterfly matrix, which can be expressed as $$B_r = W_N^r \times T_r \tag{3}$$

for the decimation in frequency process, and $$B_r = T_r \times W_N^r \tag{4}$$

for the decimation in time process.

$W_N^r = \text{diag}(1, w_N^P, w_N^{2P}, \ldots, W_N^{(r-1)P})$ represents the twiddle factor and $T_r$ is an r×r matrix representing the adder-tree in the butterfly, where $$T_r = \begin{bmatrix} w^0 & w^0 & w^0 & - & w^0 \\ w^0 & w^{N/r} & w^{2N/r} & - & w^{(r-1)N/r} \\ w^0 & w^{2N/r} & w^{4N/r} & - & w^{2(r-1)N/r} \\ - & - & - & - & - \\ w^0 & w^{(r-1)N/r} & - & - & w^{(r-1)^2 N/r} \end{bmatrix} = [T_{(l,m)}], \tag{5}$$

where $$T_{(l,m)} = w^{((lm \frac{N}{r}))_N}, \tag{6}$$

l=m=0, . . . , r−1 and $((x))_N = x$ modulo N.

The elements of the adder matrix $T_r$ and the elements of the twiddle matrix $W_N^r$, both contain twiddle factors. So, by controlling the variation of the twiddle factor during the calculation of a complete FFT, the twiddle factors and the adder matrix are incorporated into a single stage of calculation. According to equation (3), $B_r$ is the product of the twiddle factor matrix $W_N^r$ and the adder matrix $T_r$.

So, by defining $W_{(r, k, i)}$ the set of the twiddle factor matrices $W_N^r$ as:

$$W_{(r,k,i)} = \begin{bmatrix} w_{(0,k,i)} & 0 & - & 0 \\ 0 & w_{(1,k,i)} & - & 0 \\ - & - & - & - \\ 0 & 0 & - & w_{((r-1),k,i)} \end{bmatrix} = [w_{(l,m)(k,i)}], \tag{7}$$

in which, $$w_{(l,m)(k,i)} = w^{((\tilde{N}(\frac{k}{r^i}))r^i))_N} \text{ for } l = m, \text{ and 0 elsewhere}, \tag{8}$$

the modified radix—r butterfly computation $B_{r\ DIF}$ may be expressed as:

$$B_{r\ DIF} = W_{(r,k,i)} \times T_r = [B_{r\ DIF(l,m)(k,i)}] \tag{9},$$

with $B_{r\ DIF(l,m)(k,i)} = w^{((l\ m\ N/r + \tilde{N}(k/r^i)l\ r^i))_N}$ (10), l=m=0, . . . , r−1, i=0,1 . . . , n−1, k=0,1 . . . , (N/r)−1, $((x))_N$, denotes x modulo N and $\tilde{N}(k/r^i)$ is defined as the integer part of the division of k by $r^i$.

As a result, the operation of a radix-r PE for the DIF FFT can be formulated as yielding:

the column vector: $X_{(r,k,i)} = B_{r\ DIF} \times x = [X_{(l)(k,i)}]$ (11), whose $l_{th}$ element is $$X_{(l)(k,i)} = \sum_{m=0}^{r-1} x_{(m)} w^{((lmN/r + \tilde{N}(k/r^i)lr^i))_N}, \tag{12}$$

With the same reasoning as above, the operation of a radix-r DIT FFT can be derived. In fact, according to equation (4), $B_r$ is the product of the adder matrix $T_r$ and the twiddle factor matrix $W_N^r$, which is equal to:

$$B_{r\ DIT} = T_r \times W_{(r,k,i)} = [B_{r\ DIT(l,m)(k,i)}] \quad (13),$$

in which $B_{r\ DIT(l,m)(k,i)} = W^{((l\ m\ N/r + \tilde{N}(k/r^{(n-i)})mr^{(n-i)}))_N}$ (14), and $$W_{(r,k,i)} = \begin{bmatrix} w_{(0,k,i)} & 0 & - & 0 \\ 0 & w_{(1,k,i)} & - & 0 \\ - & - & - & - \\ 0 & 0 & - & w_{((r-1),k,i)} \end{bmatrix} = [w_{(l,m)(k,i)}], \quad (15)$$

where $w_{(l,m)(k,i)} = w^{((\tilde{N}(k/r^{(n-i)})mr^{(n-i)}))_N}$ for $l=m$, and 0 elsewhere (16), and $n = (\log N / \log r) - 1$.

As a result, the operation of a radix—r PE for the DIT FF will be:

the column vector $X_{(r,k,i)} = B_{r\ DIT} \times X = [X_{(l)(k,i)}]$ (17), whose $l^{th}$ element $$X_{(l)(k,i)} = \sum_{m=0}^{r-1} x_{(m)} w^{((lmN/r + \tilde{N}(k/r^{(n-i)})mr^{(n-i)}))_N}. \quad (18)$$

The derived DIF and DIT JFFT algorithms could be expressed as:

The Orderes Input Otdered Output DIT JFFT Algorithm

For this version of the FFT, the $m^{th}$ PE's input $x_{(m)}$ of the $k^{th}$ word at the $i^{th}$ iteration is fed to the $m^{th}$ PE's input by the reading address $r_{m(k,i)}$:

$$r_{m(k,i)} = m \times \left(\frac{N}{r^{(i+1)}}\right) + ((k))_{r^{n-i}} + \tilde{N}\left(\frac{k}{r^{(n-i)}}\right) \times r^{(n+1-i)}, \quad (19)$$

and the $l^{th}$ processed PE's output $X_{(l,\ k,\ i)}$ for the $k^{th}$ word at the $i^{th}$ iteration is stored by the writing address generator $W_{(r,\ k)}$ derived by the following expression:

$$W_{(r,\ k)} = l(N/r) + k \quad (20),$$

for $m = l = 0, 1, \ldots, r-1$.

The Ordered Input Ordered Output DIF JFFT Algorithm

Similar to the DIT FFT, the input sequences are fed to the PE's input by the following reading address generator:

$$r_{m(k,i)} = m \times (N/r) + k \text{ for } i=0 \quad (21)$$

$$r_{m(k,i)} = m \times \frac{N}{r^2} + \left(\left(\tilde{N}\left(\frac{k}{r^{i-1}}\right) \times \frac{N}{r}\right)\right)_N + ((k))_{r^{j-1}} + \tilde{N}\left(\frac{k}{r^i}\right) \times r^{j-1} \text{ for } i > 0, \quad (22)$$

and the $l^{th}$ processed PE's output $X_{(l)}$ for the $k^{th}$ word at the $i^{th}$ iteration is stored by the writing address generator $W_{(r,\ k)}$ expressed in equation (20). Equations (10), (16), (19), (20),

(21) and (22) are the address generators that are used to speed up the computation of the DIT and DIF JFFT.

What is claimed is:

1. An address generator for use in a system having a fast Fourier transform processor and a memory for storing data at a plurality of addresses, said memory including a memory address bus, said address generator comprising:

a plurality of adders, each adder having respective first and second input terminals and a respective output terminal;

said plurality of adders being arranged in a cascaded series of adders, wherein each respective output terminal of each adder is coupled to a respective first input terminal of a next adder of said cascaded series of adders;

a parameter of said fast Fourier transform processor being coupled to said second input terminals of said plurality of adders; and said respective output terminals of said plurality of adders being coupled to said address bus of said memory, wherein said respective output terminals of said plurality of adders correspond to said plurality of addresses.

2. An address generator in accordance claim 1, further comprising:

a plurality of modulo N circuits, each of said plurality of modulo N circuits have a respective input terminal and a respective output terminal; and wherein said output terminals of said plurality of adders are coupled to said address bus by said plurality of modulo N circuits.

3. An address generator in accordance with claim 2, wherein said address generator is a DIT twiddle coefficient address generator, wherein the memory address locations of the DIT twiddle coefficients is given by the following expression:

$$\left(\left(lm\frac{N}{r} + \tilde{N}\left(\frac{K}{r^{(n-i)}}\right)mr^{(n-i)}\right)\right)_N \quad (7)$$

which could be simplified as follow:

$$\left(\left(m \times \left(l\frac{N}{r} + \tilde{N}\left(\frac{k}{r^{(n-i)}}\right) \times r^{(n-i)}\right)\right)\right)_N, \quad (8)$$

$$\left(\left(m \times \left(l\frac{N}{r} + I \times r^{(n-i)}\right)\right)\right)_N \quad (9)$$

where I is the computed value of the integer part operation and $l = m = 0, 1, \ldots, r-1$ and $k = 0, 1, \ldots, (N/r)-1$ and $I = 0, 1, \ldots, r^i - 1$, and wherein said parameter of said fast Fourier transform processor is given by $(l\ N/r) + (r^{(n-i)} + I)$.

4. An address generator in accordance with claim 2, wherein said address generator is a DIF twiddle coefficient address generator, wherein the memory address locations of the DIF twiddle coefficients is given by the following expression:

$$\left(\left(lm\frac{N}{r} + \tilde{N}\left(\frac{K}{r^i}\right)lr^j\right)\right)_N, \quad (10)$$

which could be simplified as follow:

$$\left(\left(l \times \left(m\frac{N}{r} + \tilde{N}\left(\frac{k}{r^i}\right) \times r^i\right)\right)\right)_N, \quad (11)$$

$$\left(\left(m \times \left(l\frac{N}{r} + 1 \times r^{(n-l)}\right)\right)\right)_N, \quad (12)$$

where I is the computed value of the integer part operation by the control unit of the DIF reading address generator and l=m=0, 1, . . . , r−1 and k=0, 1, . . . , (N/r)−1 and I=0, 1, . . . , $r^{(n-i)}$−1, and wherein said parameter of said fast Fourier transform processor is given by l N/r.

5. An address generator in accordance with claim 1, wherein said address generator is a writing address generator for storing output data from said fast Fourier transform processor, wherein the $l^{th}$ processed output $X_{(l, k, i)}$ for the $k^{th}$ word at the $i^{th}$ iteration is stored into the memory address location given by:

$$A_{(l, k)} = l(N/r) + k \quad (1),$$

for l=0, 1, . . . , r−1, and k=0, 1, . . . , (N/r)−1, wherein said parameter of said fast Fourier transform processor is given by N/r.

6. An address generator in accordance with claim 1, wherein said address generator is a DIT reading address generator, wherein the $m^{th}$ PE's input $x_{(m)}$ of the $k^{th}$ word at the $i^{th}$ iteration is fed by the reading address $r_{m_{(k, i)}}$:

$$r_{m(k,i)} = m \times \left(\frac{N}{r^{(i+1)}}\right) + ((k))_{r^{n-i}} + \tilde{N}\left(\frac{k}{r^{(n-i)}}\right) \times r^{(n+1-i)} \quad (2)$$

for m=l=0,1, . . . , r−1, and wherein said parameter of said fast Fourier transform processor is given by $N/r^{(i+1)}$.

7. An address generator in accordance with claim 1, wherein said address generator is a DIF reading address generator, wherein the $m^{th}$ PE's input $x_{(m)}$ of the $k^{th}$ word at the $i^{th}$ iteration is fed by the reading address $r_{m_{(k, i)}}$:

$$r_{m(k,i)} = m \times (N/r) + k \text{ for } i=0 \quad (5),$$

and $$r_{m(k,i)} = \quad (6)$$
$$m \times \frac{N}{r^2} + \left(\left(\tilde{N}\left(\frac{k}{r^{i-1}}\right) \times \frac{N}{r}\right)\right)_N + ((k))_{r^{i-1}} + \tilde{N}\left(\frac{k}{r^i}\right) \times r^{i-1} \text{ for } i > 0,$$

for m=l=0,1, . . . , r−1, and wherein said parameter of said fast Fourier transform processor is given by $N/r^2$.

8. An address generator in accordance with claim 1, wherein said address generator is a DIT twiddle coefficient address generator, wherein said memory address locations of said twiddle coefficients are provided by the following expression:

$$\left(\left(lm\frac{N}{r} + \tilde{N}\left(\frac{K}{r^{(n-i)}}\right)mr^{(n-i)}\right)\right)_N \quad (7)$$

where I is the computed value of the integer part operation by the control unit of the DIT reading address generator and l=m=0, 1, . . . , r−1 and k=0, 1, . . . , (N/r)−1 and I =0, 1, . . . , $r^i$−1, where the term lm(N/r) in equation (7) is set to zero for use with conventional DIT butterflies, and wherein said parameter of said fast Fourier transform processor is given by I $r^{(n-i)}$.

9. An address generator in accordance with claim 1, wherein said address generator is a DIF twiddle coefficient address generator, wherein said memory address locations of said twiddle coefficients are provided by the following expression:

$$\left(\left(lm\frac{N}{r} + \tilde{N}\left(\frac{K}{r^i}\right)lr^i\right)\right)_N, \quad (10)$$

where I is the computed value of the integer part operation by the control unit of the DIF reading address generator and l=m=0, 1, . . . , r−1 and k=0, 1, . . . , (N/r)−1 and I=0, 1, . . . , $r^{(n-i)}$−1 , wherein the term lm(N/r) in equation (10) is set to zero for use with conventional DIF butterflies, and wherein said parameter of said fast Fourier transform processor is given by I $r^{(i)}$.

* * * * *